(12) United States Patent  
Yu et al.

(10) Patent No.: US 9,032,334 B2
(45) Date of Patent: May 12, 2015

(54) ELECTRONIC DEVICE HAVING 3-DIMENSIONAL DISPLAY AND METHOD OF OPERATING THEREOF

(75) Inventors: Sunjin Yu, Seoul (KR); Taehyeong Kim, Seoul (KR); Sang Ki Kim, Seoul (KR); Soungmin Im, Seoul (KR); Sangki Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 724 days.

(21) Appl. No.: 13/333,603

(22) Filed: Dec. 21, 2011

(65) Prior Publication Data

US 2013/0167092 A1 Jun. 27, 2013

(51) Int. Cl.
*G06F 3/048* (2013.01)
*G06F 3/0481* (2013.01)

(52) U.S. Cl.
CPC .................................. *G06F 3/04815* (2013.01)

(58) Field of Classification Search
CPC .................................................... G06F 3/04815
USPC .................................. 715/848, 849, 850, 852
See application file for complete search history.

(56) References Cited

U.S. PATENT DOCUMENTS

| | | | | |
|---|---|---|---|---|
| 2009/0064018 A1* | 3/2009 | Horvitz et al. | ................. | 715/764 |
| 2009/0237763 A1* | 9/2009 | Kramer et al. | ................... | 359/23 |
| 2009/0325705 A1* | 12/2009 | Filer et al. | ........................ | 463/39 |
| 2010/0053304 A1* | 3/2010 | Underkoffler et al. | .......... | 348/42 |
| 2010/0113153 A1* | 5/2010 | Yen et al. | ......................... | 463/37 |
| 2010/0115455 A1* | 5/2010 | Kim | .............................. | 715/781 |
| 2010/0138798 A1* | 6/2010 | Wilson et al. | ................. | 715/863 |
| 2010/0306261 A1* | 12/2010 | Geisner et al. | ................ | 707/776 |
| 2010/0315413 A1* | 12/2010 | Izadi et al. | ..................... | 345/419 |
| 2011/0080339 A1* | 4/2011 | Sun et al. | ....................... | 345/157 |
| 2011/0119640 A1* | 5/2011 | Berkes et al. | ................. | 715/863 |
| 2011/0154266 A1* | 6/2011 | Friend et al. | .................. | 715/863 |
| 2011/0164029 A1* | 7/2011 | King et al. | ..................... | 345/419 |
| 2011/0292036 A1* | 12/2011 | Sali et al. | ....................... | 345/419 |
| 2012/0133585 A1* | 5/2012 | Han et al. | ...................... | 345/158 |
| 2012/0223882 A1* | 9/2012 | Galor et al. | .................... | 345/157 |
| 2012/0274550 A1* | 11/2012 | Campbell et al. | ............. | 345/156 |
| 2013/0097519 A1* | 4/2013 | Andersson et al. | ........... | 715/744 |

FOREIGN PATENT DOCUMENTS

| | | |
|---|---|---|
| JP | 2000-132306 A | 5/2000 |
| KR | 10-2003-0002937 A | 1/2003 |
| KR | 10-2003-0075399 A | 9/2003 |
| KR | 10-2005-0065198 A | 6/2005 |

* cited by examiner

*Primary Examiner* — Anil Bhargava
(74) *Attorney, Agent, or Firm* — Birch, Stewart, Kolasch & Birch, LLP

(57) ABSTRACT

According to the present invention, disclosed is an electronic device having a three-dimensional display, comprising a sensor obtaining information about a gesture's motion; a three-dimensional display displaying a pointer and/or an object moving in three-dimensional space according to the gesture's motion; and a controller checking applications in execution, determining a movement distance of the pointer and/or the object in proportion to a movement distance of the gesture by taking account of gesture sensitivity selected according to the type of the checked application, and controlling the display to move the pointer and/or the object as much as the determined movement distance.

10 Claims, 23 Drawing Sheets

| Application | Sensitivity | | |
|---|---|---|---|
| | x | y | z |
| TV | a | b | c |
| Messenger | d | e | f |
| Browser | g | h | i |
| ⋮ | ⋮ | ⋮ | ⋮ |

(a) <At the time of running application A>

(b) <At the time of running application B>

(a)

(a)

(a)

(b)

(c)

ELECTRONIC DEVICE HAVING 3-DIMENSIONAL DISPLAY AND METHOD OF OPERATING THEREOF

BACK GROUND

1. Field

The present invention relates to an electronic device having three-dimensional display and a method of operating the device. More specifically, the present invention relates to an electronic device having three-dimensional display and a method of operating the device providing a user interface capable of controlling positions of a three-dimensional icon and a virtual layer including the icon according to the gesture of the user and sensitivity of the gesture.

2. Related Art

As the function of a terminal such as a personal computer, a notebook computer, or a cellular phone is diversified, the terminal is implemented in the form of a multimedia player having various functions. Examples of such functions include capturing pictures or videos, playing music or video files, playing games, receiving broadcasting programs, etc.

A terminal as a multimedia player can be classified into a display device in a sense that the terminal generally includes a display function though which various kinds of visual information can be displayed. A display device can be classified into a mobile type and a stationary type according to mobility. Examples of a mobile display device can include a notebook computer, a cellular phone, and so on while those of a stationary display device a television, a monitor for a desktop computer, etc.

Recently, display devices are evolving into three-dimensional display devices displaying three-dimensional visual information beyond displaying two-dimensional visual information. Electronic devices such as television sets or smart phones equipped with three-dimensional display devices are already being commercialized. Those electronic devices display three-dimensional objects such as icons in three-dimensional space.

Meanwhile, user interfaces which can sense the motion and/or gesture (hereinafter, it is called 'gesture') of the user by using an input device such as a camera are being developed, where the user interfaces can process various types of input commands and information from the gesture.

In the case of displaying information through such a three-dimensional display, information can be displayed to give a feeling of depth along z-axis in addition to displaying planar information on an x-y plane. In this regard, to process various types of input commands and information based on a gesture, not only the gesture simply in an up, down, left, and right direction but also the gesture along the z-axis should be sensed and properly reflected in the various types of input commands and information.

SUMMARY

The present invention relates to a three-dimensional display device and a method for the device. More specifically, the present invention has been made in an effort to provide a user interface capable of controlling positions of three dimensional icons and a virtual layer including the icons according to the user's gesture, thereby enabling the user to easily access various icons (or menu layer) provided in a three-dimensional image.

According to a first embodiment of the present invention, an electronic device having a three-dimensional display comprises a sensor obtaining information about a gesture's motion; a three-dimensional display displaying a pointer and/or an object moving in the three-dimensional space according to the gesture's motion; and a controller checking applications in execution, determining a movement distance of the pointer and/or the object in proportion to a movement distance of the gesture by taking account of gesture sensitivity selected according to the type of the checked application, and controlling the display to move the pointer and/or the object as much as the determined movement distance.

At this time, the gesture sensitivity can correspond to each of multiple applications.

Also, the controller can select the gesture sensitivity by taking account of the difference between a maximum and a minimum depth implemented by the checked application.

The gesture sensitivity can be selected differently for separate applications.

The gesture sensitivity can include sensitivity along x-axis, sensitivity along y-axis, and sensitivity along z-axis; only the sensitivity along the z-axis can be varied according to applications. Alternatively, all the sensitivity along the x-axis, the y-axis, and the z-axis can be selected differently from one another.

According to a second embodiment of the present invention, an electronic device having a three-dimensional display comprises a sensor obtaining information about a gesture's motion; a three-dimensional display displaying a pointer and/or an object moving in the three-dimensional space according to the gesture's motion; and a controller checking the position of the displayed pointer and/or the object, determining a movement distance of the pointer and/or the object in proportion to a movement distance of the gesture by taking account of gesture sensitivity selected according to the checked position, and controlling the display to move the pointer and/or the object as much as the determined movement distance.

At this time, the controller can select the gesture sensitivity according to an area to which the position of the object belongs.

Also, the controller can select the gesture sensitivity according to an application corresponding to the position of the object.

According to a third embodiment of the present invention, an electronic device having a three-dimensional display comprises a sensor obtaining information about a gesture's motion; a three-dimensional display displaying a first object, a second object, and a pointer moving according to the motion of the gesture in three-dimensional space; and a controller checking the distance between the first and the second object, determining a movement distance of the pointer in proportion to a movement distance of the gesture by taking account of gesture sensitivity selected according to the checked distance, and controlling the display to move the pointer as much as the determined movement distance of the pointer.

According to a fourth embodiment of the present invention, an electronic device having a three-dimensional display comprises a sensor obtaining information about a gesture's motion; a three-dimensional display displaying at least one object in three-dimensional space; and a controller determining a movement distance of the object in proportion to a movement distance of the gesture by taking account of gesture sensitivity selected according to attributes of the object selected from the gesture among the at least one object, and controlling the display to move the object as much as the determined movement distance of the object.

At this time, the attributes can include at least one among file size, the number of files, and remaining battery capacity.

According to another aspect of the first embodiment of the present invention, an electronic device having a three-dimensional display comprises obtaining information about a gesture's motion; displaying a pointer and/or an object moving in the three-dimensional space according to the gesture's motion; checking applications in execution and selecting gesture sensitivity according to the type of the checked application; by taking account of gesture sensitivity selected according to the type of the checked application, determining a movement distance of the pointer and/or the object in proportion to a movement distance of the gesture; and displaying the pointer and/or object while moving the pointer and/or object as much as the determined movement distance.

Advantageous Effects of the Invention

The present invention provides advantageous effects as described below.

First, since much larger sensitivity can be selected for an application having a much larger depth range, a movement distance of an object and/or a pointer can be made much larger for a movement distance of the same user gesture. Therefore, even if an application having a much larger depth range is executed, an inconvenience of the user's having to move his or her hand (H) much more along the z-axis (in the case where the user gesture corresponds to a hand gesture) to move an object and/or a point from a minimum depth to a maximum depth can be relieved. In the case of multitasking two or more applications through a single display, too, by making the respective applications respond to the user's gesture according to gesture sensitivity more appropriate to each of the applications, user convenience can be greatly improved.

Second, as gesture sensitivity can be set differently for separate areas of virtual three-dimensional space displayed through a display unit, a possibility of providing much more various user interfaces for a single application can be increased.

Third, in the case when a plurality of objects are displayed through a display unit, gesture sensitivity can be selected/set differently according to distances among the objects; accordingly, even if objects are separated far away from each other, an inconvenience of the user's having to move his or her hand (H) much more when the user attempts to move a pointer from an object displayed most closely to an object displayed most distantly can be relieved. Also, since gesture sensitivity can be set differently according to a distance between objects in virtual three-dimensional space, a possibility of providing much more various user interfaces can be increased.

Fourth, in the case when a plurality of objects are displayed through a display unit, according to attributes corresponding to the objects, gesture sensitivity can be selected/set differently; accordingly, attributes corresponding to an object can be provided for the user as feedback according to a movement distance of the object according to the user's gesture. Therefore, a possibility of providing much more various user interfaces can be increased.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

FIG. 12 is a table showing applications according to a first embodiment of the present invention and their corresponding gesture sensitivity;

DETAILED DESCRIPTION OF THE INVENTION

The objectives, characteristics, and advantages of the present invention described above will be more clearly understood through detailed descriptions below related to appended drawings. In what follows, preferred embodiments according to the present invention will be described in detail with reference to appended drawings. Throughout this document, the same reference number denotes the same constituting element. Also, if it is determined that detailed descriptions about prior art or composition related to the present invention unnecessarily lead to misunderstanding of the technical principles and scope of the present invention, the corresponding descriptions will be omitted.

In the following, a display device according to the present invention will be described in detail with reference to appended drawings. Suffixes of "module" and "unit" for constituting elements in the descriptions below have been introduced or used in a mixed form only for the convenience of preparing this document; thus, they do not carry any other intentions or particular roles in themselves distinguished from one another.

Figure 1:
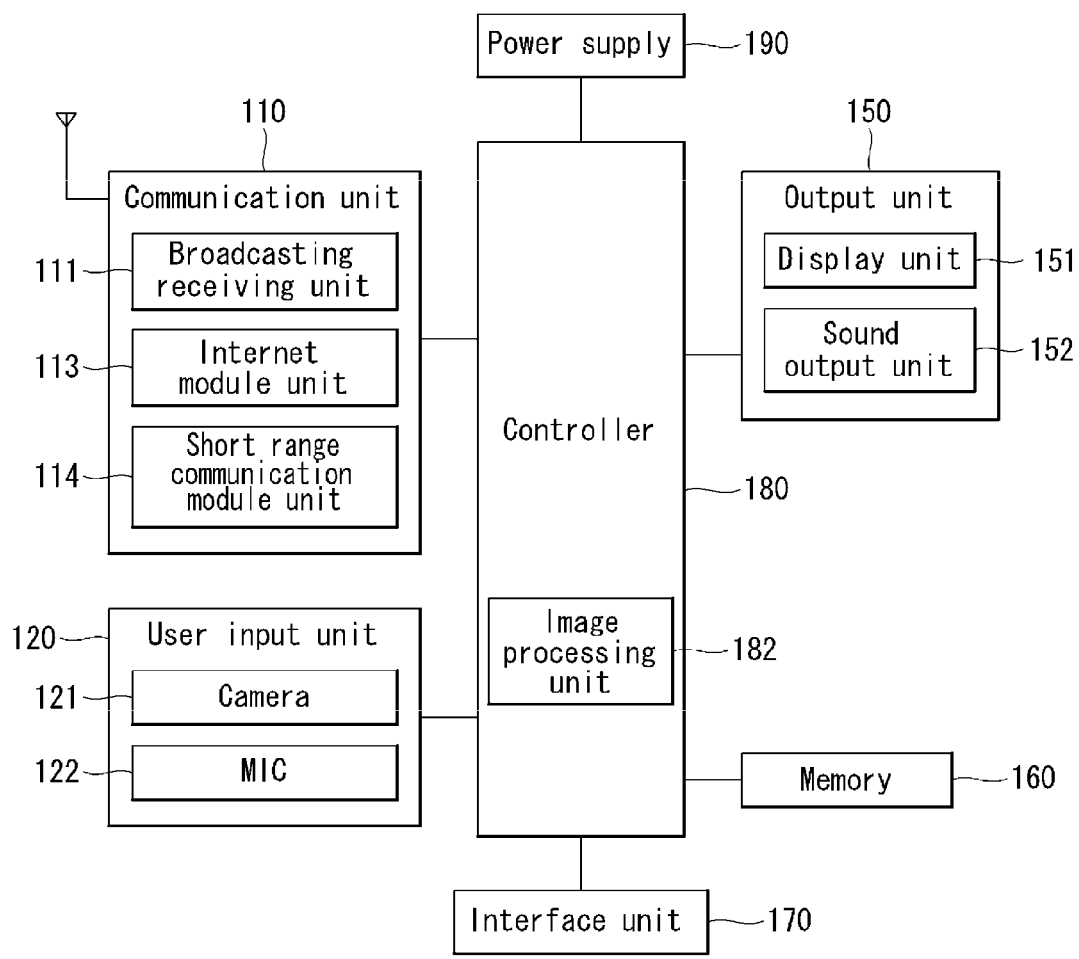
FIG. 1 is a block diagram of a display device related to one embodiment of the present invention.

FIG. 1 is a block diagram of a display device related to one embodiment of the present invention.

As shown in the figure, a display device 100 according to one embodiment of the present invention can comprise a communication unit 110, a user input unit 120, an output unit 150, a memory 160, an interface unit 170, a controller 180, and a power supply 190. FIG. 1 shows constituting elements which can be included in a conventional display device. Therefore, it is equally possible to implement a display device including a much larger or smaller number of constituting elements.

The communication unit 110 can include one or more modules enabling communication between the display device 100 and a communication system or between the display device 100 and another device. For example, the communication unit 110 can comprise a broadcasting receiving unit 111, an Internet module unit 113, a short range communication module unit 114, etc.

The broadcasting receiving unit 111 receives broadcasting signals and/or broadcasting-related information from an external broadcasting management server through a broadcasting channel.

A broadcasting channel can include a satellite channel or a terrestrial channel. A broadcasting management server can indicate a server generating and transmitting broadcasting signals and/or broadcasting-related information; or a server receiving pre-generated broadcasting signals and/or broadcasting-related information and transmitting them to a terminal. Broadcasting signals can include not only TV broadcasting signals, radio broadcasting signals, and data broadcasting signals but also broadcasting signals in the form of TV broadcasting signals or radio broadcasting signals combined with data broadcasting signals.

Broadcasting-related information can indicate information related to broadcasting channels, broadcasting programs, or broadcasting service providers. Broadcasting-related information can be provided through a communication network.

Broadcasting-related information can be implemented in various ways. For example, broadcasting-related information can be implemented in the form of EPG (Electronic Program Guide) of DMB (Digital Multimedia Broadcasting) or ESG (Electronic Service Guide) of DVB-H (Digital Video Broadcast-Handheld).

The broadcasting receiving unit 111 can receive broadcasting signals by using various broadcasting systems. Broadcasting signals and/or broadcasting-related information received through the broadcasting receiving unit 111 can be stored in the memory 160.

The Internet module unit 113 can indicate a module for Internet connection. The Internet module unit 113 can be embedded inside the display device 100 or can be installed outside of the display unit 100.

The short range communication module unit 114 denotes a module for short range communication. Short range communication technologies include Bluetooth, RFID (Radio Frequency Identification), IrDA (Infrared Data Association), UWB (Ultra Wideband), ZigBee, and so on.

The user input unit 120 is intended for receiving audio or video signal inputs, including a camera 121, a MIC 122, and so on.

The camera 121 processes image frames consisting of still images or moving images obtained by an image sensor in a video communication mode or a capture mode. Image frames processed can be displayed on the display unit 151. The camera 121 can be a camera capable of capturing 2D or 3D images and can be composed of a single 2D or 3D camera or a combination of both.

Image frames processed by the camera 121 can be stored in the memory 160 or can be transmitted to the outside through the communication unit 110. The camera 121 can be made of two or more cameras according to a composition type of the display device 100.

The MIC 122 receives external sound signals through a microphone and converts the signals into electrical voice data in a communication mode, recording mode, or voice recognition mode. The MIC 122 can implement various noise suppression algorithms for removing noise generated while receiving external sound signals. Also, through the MIC 122, various voice commands for activating the display device 100 and carrying out functions can be received from the user.

The output unit 150 can comprise a display unit 151, a sound output unit 152, and so on.

The display unit 151 displays information processed at the display device 100. For example, a UI (User Interface) or GUI (Graphic User Interface) related to the display device 100 are displayed. The display unit 151 can correspond to at least one of liquid crystal display, thin film transistor-liquid crystal display, organic light-emitting diode, flexible display, and 3D display. Also, the display unit 151 can be implemented as a transparent or light-transmitting type. The above can be called a transparent display; a typical example of a transparent display includes a transparent LCD. The back structure of the display unit 151 can also be made to have a light-transmitting structure. Thanks to such a structure, the user can see objects located in the rear of a terminal body through the area occupied by the display unit 151 of the terminal body. According to an implementation type of the display device 100, two or more display units 151 can exist. For example, a plurality of display units 151 can be disposed in a single surface of the display device 100 being separated from one another or forming a single body as a whole; or the display units 151 can be disposed separately on different surfaces.

In the case where the display unit 151 and a sensor detecting a touch motion (hereinafter, it is called a 'touch sensor') form a layer structure with each other (hereinafter, it is called a 'touch screen' for short), the display unit 151 can be used as an input device in addition to an output device. A touch sensor, for example, can take the form of a touch film, a touch sheet, or a touch pad.

The touch sensor can be so composed as to convert pressure applied to a particular part of the display unit 151 or capacitance change developed at a particular part of the display unit 151 into electrical input signals. The touch sensor can be composed to detect not only the touch position and area but also the pressure at the time of a touch motion.

If a touch input is detected by the touch sensor, a signal corresponding to the input is sent to a touch controller. The touch controller processes the signal and transmits the corresponding data to the controller 180. By doing so, the controller 180 can know which part of the display unit 151 has been touched.

The sound output unit 152 can output audio data received from the communication unit 110 or stored in the memory 160. The sound output unit 152 can output sound signals related to a function (e.g., a call signal receiving sound, a message receiving sound, etc.) carried out at the display device 100. The sound output unit 152 can include a receiver, a speaker, a buzzer, and so on.

The memory 160 can store programs for operation of the controller 180 and also temporarily store input/output data (e.g., a phonebook, messages, still images, videos, etc.). The memory 160 can store data about various vibration patterns and sounds output at the time of a touch input on a touch screen.

The memory 160 can include at least one type of a storage medium among a flash memory type, a hard disk type, a multimedia card micro type, a card type memory (e.g., SD or XD memory), RAM (Random Access Memory), m SRAM (Static Random Access Memory), ROM (Read-Only Memory), EEPROM (Electrically Erasable Programmable Read-Only Memory), PROM (Programmable Read-Only Memory), magnetic memory, and an optical disk. The display device 100 can operate in association with a web storage which carries out a storage function of the memory 160 in the Internet.

The interface unit 170 provides a path to all the external devices connected to the display device 100. The interface unit 170 receives data or power from an external device and distributes the data or the power to each constituting element inside the display device 100; or lets the data inside the display device 100 transmitted to an external device. For example, the interface unit 170 can include a wired/wireless headset port, an external charger port, a wired/wireless data port, a memory card port, a port connecting a device equipped with an identifying module, an audio I/O port, a video I/O port, an earphone port, etc.

The controller 180 generally controls the overall operation of the display device. For example, the controller 180 carries out control and processing related to voice communication, data communication, and video communication. The controller 180 can be equipped with an image processing unit 182 for processing images. The image processing unit 182 will be described in more detail at the corresponding part of this document.

The power supply 190, according to the control of the controller 180, receives external and internal power and provides power required for the operation of the respective constituting elements.

Various embodiments described here can be implemented in a recording medium readable by a computer or a device similar to a computer by using software, hardware, or a combination of both, for example. According to a hardware implementation, the embodiment described in this document can be implemented by using at least one among ASICs (Application Specific Integrated Circuits), DSPs (Digital Signal Processors), FPGAs (Field Programmable Gate Arrays), processors, controllers, micro-controllers, micro-processors, and electrical units for performing functions. For some cases, those embodiments can be implemented by the controller 180.

According to a software implementation, embodiments such as procedures or functions can be implemented together with a separate software module carrying out at least one function or operation. Software codes can be implemented by a software application written by an appropriate programming language. Also, software codes can be stored in the memory 160 and can be carried out by the controller 180.

Figure 2:
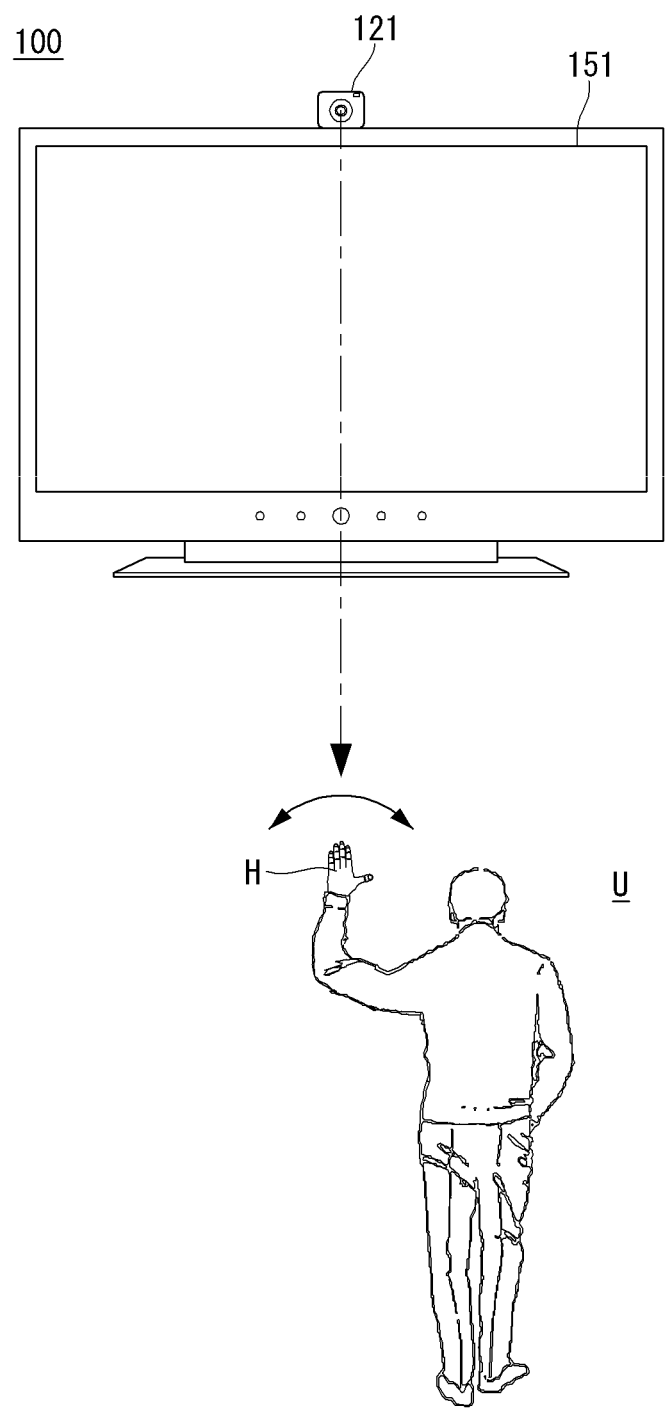
FIG. 2 illustrates an example of a gesture input by the user for the display device of FIG. 1.

FIG. 2 illustrates an example of a gesture input by the user for the display device of FIG. 1.

As shown in the figure, the display device 100 according to one embodiment of the present invention can capture the gesture of the user (U) and carry out a relevant function according to the gesture.

The display device 100 can correspond to various types of electronic device including the display unit 151 capable of displaying images. In other words, the electronic device can correspond to a stationary type fixed to a particular place because of its volume such as a TV shown in FIG. 2 or a mobile terminal such as a cellular phone. The display device 100 can be equipped with the camera 121 capable of capturing the user's (U) gesture.

The camera 121 can correspond to an optical electronic device capturing a forward scene of the display device 100. The camera 121 can correspond to a two-dimensional camera capturing two-dimensional images and/or a three-dimensional camera capturing three-dimensional images. Although FIG. 2 illustrates a case where a single camera 121 is attached on the top in the middle of the display device 100 for the convenience of understanding, camera 121 type and position, and the number of cameras can be varied depending on specific needs.

The controller 180, finding a user (U) having control authority, can track the user (U) with control authority. Empowering control authority and tracking can be carried out based on images captured through the camera 121 prepared for the display device 100. In other words, the controller 180, by analyzing captured images, can determine whether a particular user (U) exists, whether the particular user (U) carries out a gesture motion required for obtaining control authority, whether the particular user (U) is moving, etc.

The controller 180 can analyze the gesture of the user who has control authority from captured images. For example, even if the user makes a particular gesture, a particular function may not be performed unless the user (U) is qualified for control authority. However, if the user (U) has control authority, a particular function corresponding to the particular gesture can be carried out.

The gesture of the user (U) can correspond to various motions incorporating the user's (U) body. For example, a motion of the user's (U) sitting, standing, running, or moving can be regarded as a gesture. Furthermore, a motion incorporating the movement of a head, feet, or hands (H) can also be regarded as a gesture. In what follows, descriptions will be provided only for those cases where the user (U) makes a hand gesture by using his or her hand (H) from among various gestures that can be made by the user (U). However, it should be understood that those descriptions are intended only for the convenience of understanding and are not meant to indicate that the present invention is limited only to hand gestures of the user.

The present invention, in particular, can be applied to the case where the display unit 141 is a three-dimensional display. In the following, a method for displaying a stereoscopic image through the display unit 151 (which is assumed to display three-dimensional images) will be described.

Figure 3:
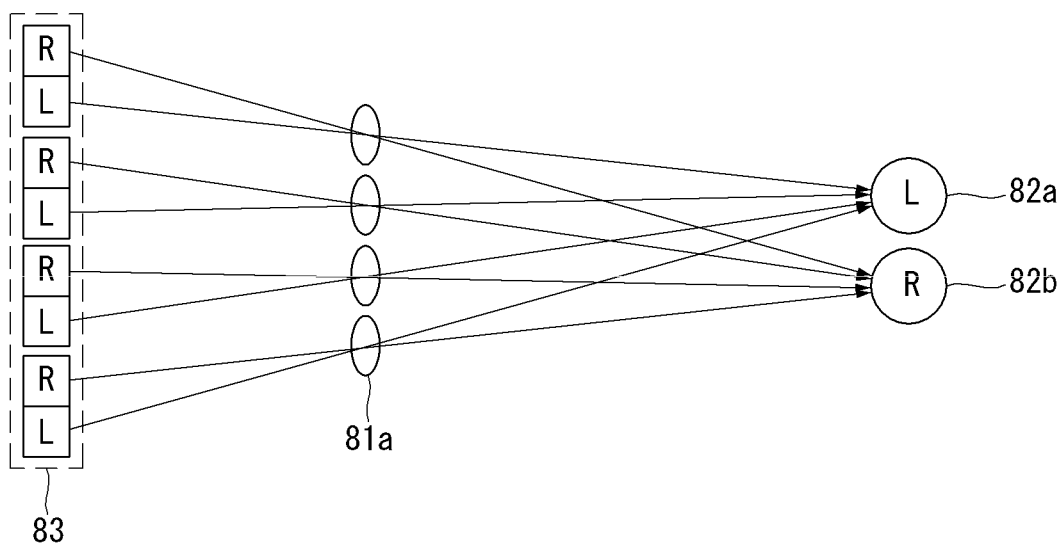
FIGS. 3 and 4 illustrate a method of displaying a stereoscopic image based on binocular parallax related to embodiments of the present invention.
Figure 4:
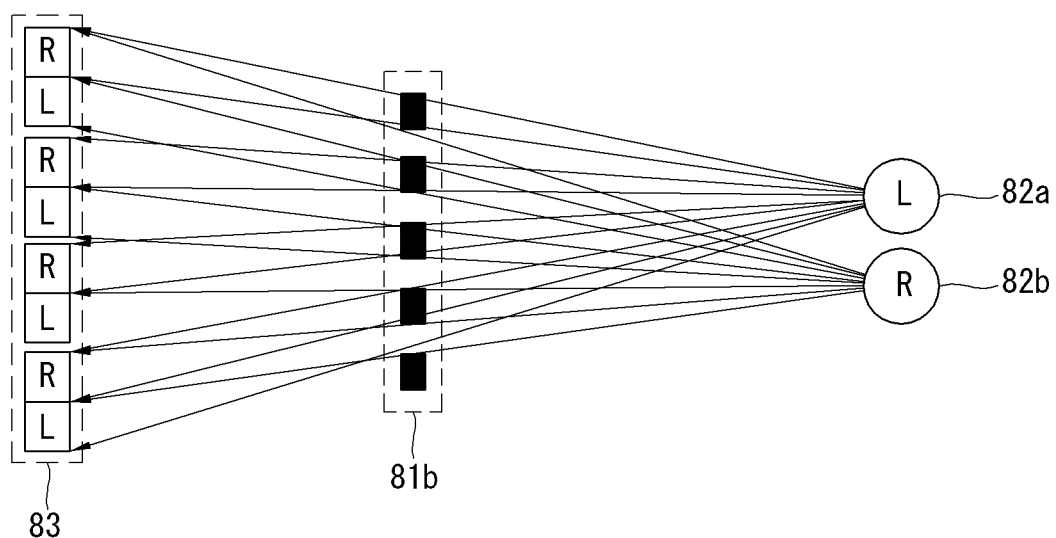

FIGS. 3 and 4 illustrate a method of displaying a stereoscopic image based on binocular parallax related to embodiments of the present invention. FIGS. 5 to 8 illustrate a method for displaying a stereoscopic image.

Binocular parallax or stereo disparity denotes difference in image location of an object seen by the left and right eyes of a human. If an image seen by the left eye and an image seen by the right eye are synthesized inside the human brain, the synthesized image generates three-dimensional sensation for the human. In what follows, a phenomenon that a human feels a sense of depth according to binocular parallax is called a 'stereoscopic vision' while the image invoking the stereoscopic vision is called a 'stereoscopic image'. Also, if a particular object included in an image generates the stereoscopic vision, the corresponding object is called a 'stereoscopic object'.

A method for displaying a stereoscopic image according to binocular parallax is classified into a glass type display requiring special glasses and auto-stereoscopic display not requiring glasses. The glass type can be further divided into a method of using colored eyeglasses with wavelength selectivity, a method of using polarizing eyeglasses based on a light filtering effect according to polarization difference, and a time sharing method showing left and right images alternately within the afterimage time of an eye. In addition to the above, there is still a method of obtaining three-dimensional sensation about a movement in the left and right direction according to the time difference in the human visual system originating from the difference of transmittance by installing filters having different transmittance for the left and right eyeglass.

On the other hand, for auto-stereoscopic display generating three-dimensional sensation at an image display side rather than an observer-side, a parallax barrier method, a lenticular lens method, or a microlens array method are used.

With reference to FIG. 3, the display unit 151 comprises a lenticular lens array 81a to display stereoscopic images. The lenticular lens array 81a is disposed between a display plate 83 composed of pixels (L) projected to the left eye 82a and pixels (R) projected to the right eye 82b arranged along a horizontal direction in an alternate fashion; and the left and right eyes 82a, 82b, showing an optical direction-selection property for the pixels (L) projected to the left eye 82a and the pixels (R) projected to the right eye 82b. Accordingly, an image passing through the lenticular lens array 81a is observed separately by the left 82a and the right eye 82b and the human brain synthesizes the image observed by the left eye 82a and the image observed by the right eye 82b, eventually viewing a stereoscopic image.

With reference to FIG. 4, the display unit 151 comprises a parallax barrier 81b in the form of a vertical slit plate to display stereoscopic images. The parallax barrier 81b is disposed between a display plate 83 composed of pixels m (L) projected to the left eye 82a and pixels (R) projected to the right eye 82b arranged along a horizontal direction in an alternate fashion; and the left and right eyes 82a, 82b, where images are split and projected to the left 82a and the right eye 82b through apertures forming a vertical slit plate. Therefore, the human brain synthesizes the image observed by the left eye 82a and the image observed by the right eye 82b, eventually viewing a stereoscopic image. The parallax barrier 81b is turned on and separates incident views only when a stereoscopic image is to be displayed, whereas it is turned off without separating incident views in the case of displaying a two-dimensional image.

Meanwhile, the methods of displaying stereoscopic images described above have been introduced to describe embodiments of the present invention and thus, the present invention is not limited to the above. The present invention can display stereoscopic images based on stereo disparity in various ways in addition to those methods described above. For example, stereoscopic images can be displayed by using a stereoscopic image display method based on a polarization and a time sharing method which are classified into a glass-type stereoscopic image generation method.

Figure 5:
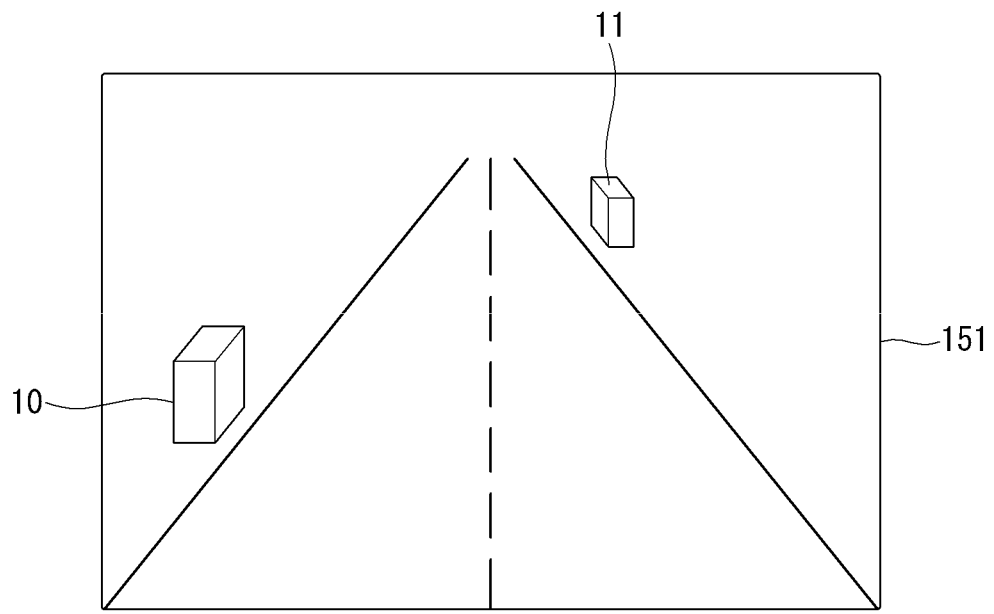
FIGS. 5 to 8 illustrate a method for displaying a stereoscopic image.

FIG. 5 illustrates an example where a stereoscopic image including a plurality of image objects is displayed.

For example, the stereoscopic image shown in FIG. 5 can be an image obtained through the camera 121. The stereoscopic image includes a first image object 10 and a second image object 11. Here, for the convenience of description, it is assumed to have two image objects 10, 11 but in reality, much more image objects can be included in the stereoscopic image.

The controller 180 can display images obtained in real-time through the camera 121 on the display unit 151 in the form of a camera preview.

The controller 180 can obtain at least one stereo disparity corresponding to each of the at least one image object.

If the camera 121 is a 3D camera which can obtain the left and right eye image, the controller 180 can obtain stereo disparities of the first image object 10 and the second image object 11 respectively through the left and the right eye image obtained through the camera 121.

Figure 6:
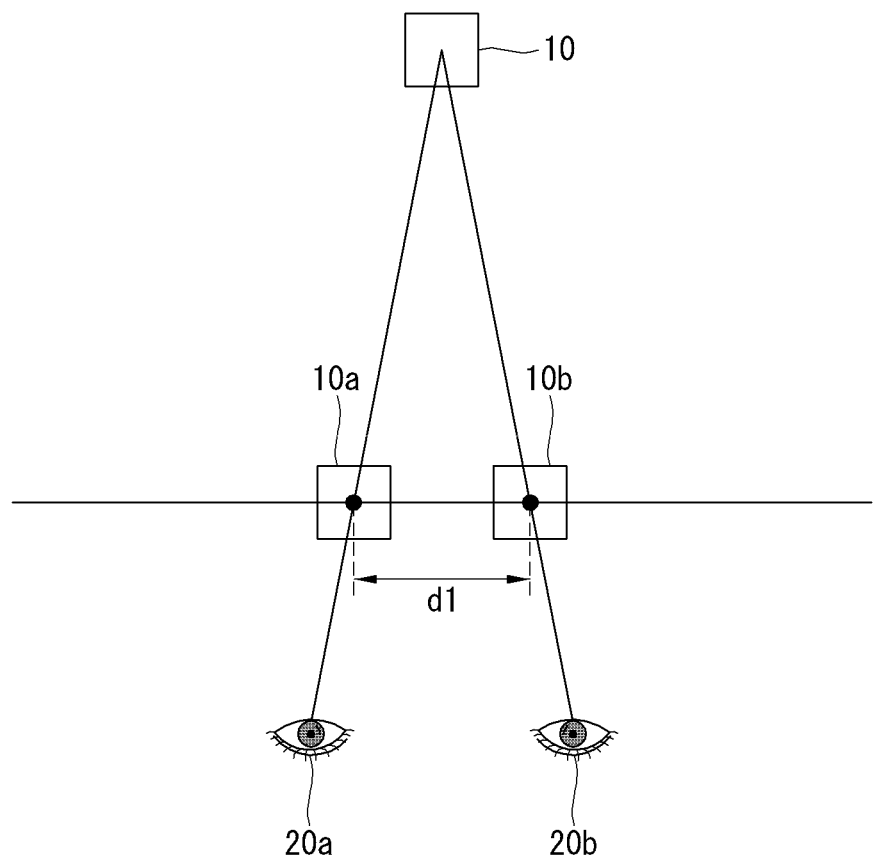

FIG. 6 illustrates stereo disparity of an image object included in a stereoscopic image.

For example, with reference to FIG. 6, the first image object 10 can consists of a left eye image 10a viewed through the left eye of the user and a right eye image 10b viewed through the right eye of the user.

The controller 180 can obtain stereo disparity corresponding to the first image object 10 through the left eye image 10a and the right eye image 10b.

Meanwhile, if the camera is a 2D camera, the controller 180, by applying a predetermined algorithm converting 2D images into 3D images, can convert a 2D image obtained through the camera 121 into a stereoscopic image and display the converted image on the display unit 151.

Also, the controller 180, by using the left and the right eye image generated through the image conversion algorithm, can obtain stereo disparity of the first image 10 object and the second image object 11 respectively.

Figure 7:
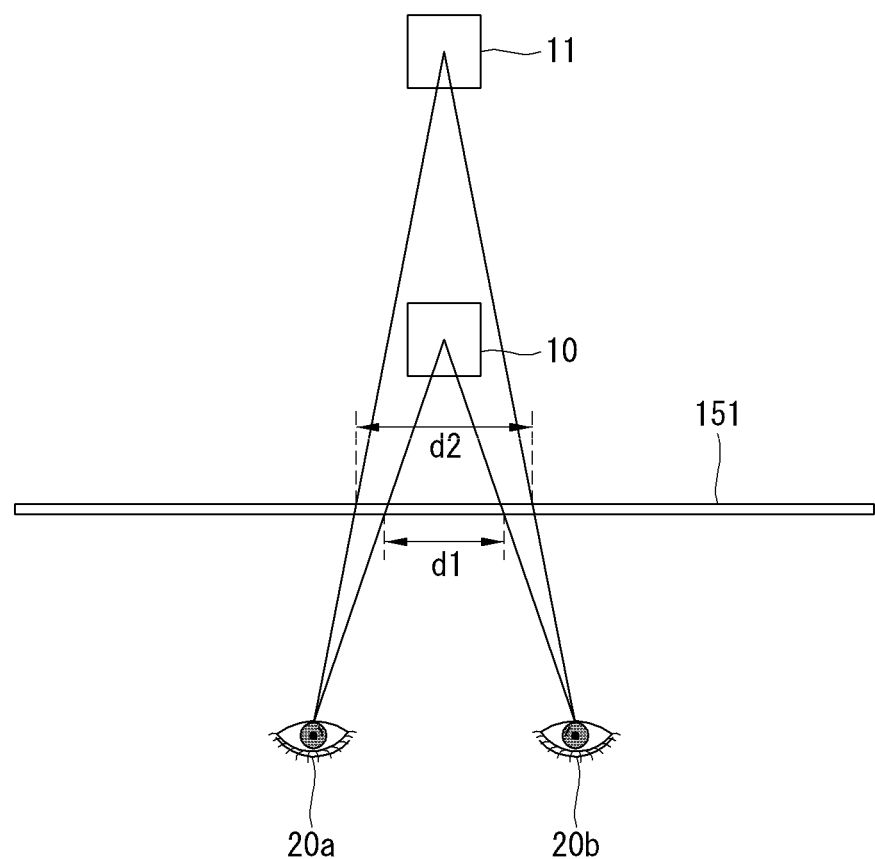

FIG. 7 provides comparative illustration of stereo disparities of the image objects 10, 11 of FIG. 5.

With reference to FIG. 7, the stereo disparity d1 of the first image object 10 and the stereo disparity d2 of the second image object 11 are different from each other. Also, as shown in FIG. 7, since d2 is larger than d1, the second image object 11 looks more distant from the user than the first image object 10.

The controller 180 can obtain at least one graphic object corresponding to each of the at least one image object [S120]. And the controller 180 can display the at least one graphic object on the display unit 151 to have the corresponding stereo disparity.

Figure 8:
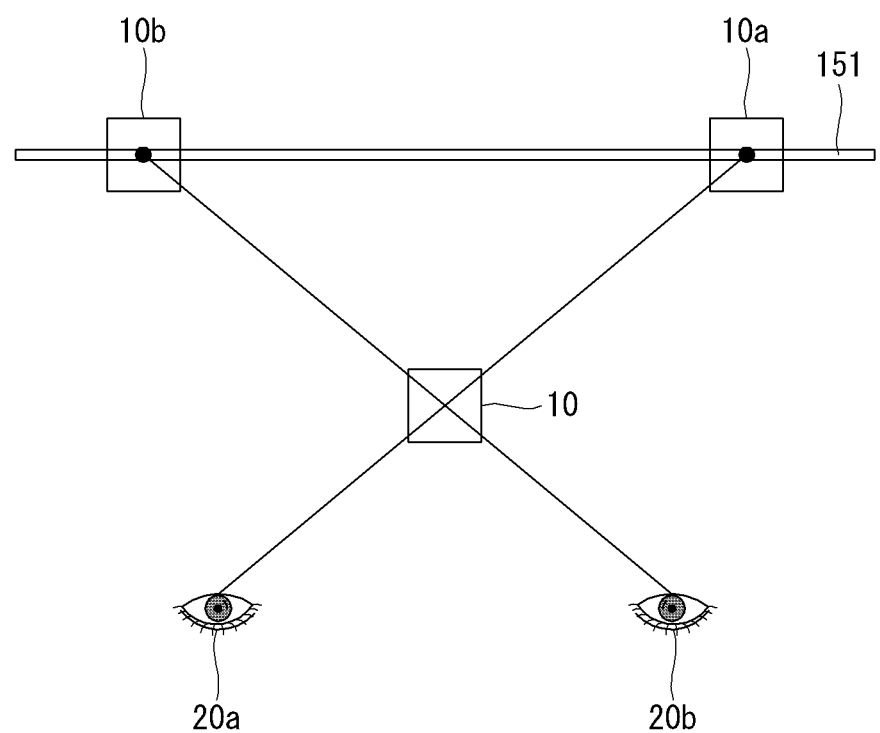

FIG. 8 shows a first image object 10 on the display unit 151 which can provide three-dimensional sensation to the user. As shown in the figure, the positions of the left 10a and the right eye image 10b on the display unit 151 can be the reverse of FIG. 7. If the positions of the left 10a and the right eye image 10b are displayed in reverse, the left eye 20a and the right eye 10b can see images in opposite directions, respectively. Therefore, the user can feel that the first image object 10 is displayed in front of the display unit 151 at a point where two lines of projection intersect each other. In other words, a positive sense of depth can be obtained against the display unit 151. This is different from the case of FIG. 7 providing a negative sense of depth where the first image object is sensed to be in the back of the display unit 151.

The controller 180, by displaying a stereoscopic image to provide a positive or a negative sense of depth depending on the needs, enables the user to have a varying sense of depth.

In what follows, a method for controlling operation of an electronic device according to the present invention will be described. For the convenience of description, an electronic device described below through various embodiments is assumed to correspond to the electronic device introduced before. However, it should be understood that a method for operating an electronic device according to the present invention is not limited to various embodiments for a method of operating an electronic device according to the present invention implemented in the electronic device described before.

First Embodiment

A method for controlling operation of an electronic device according to a first embodiment of the present invention will be described with reference to FIGS. 9 to 14.

Figure 9:
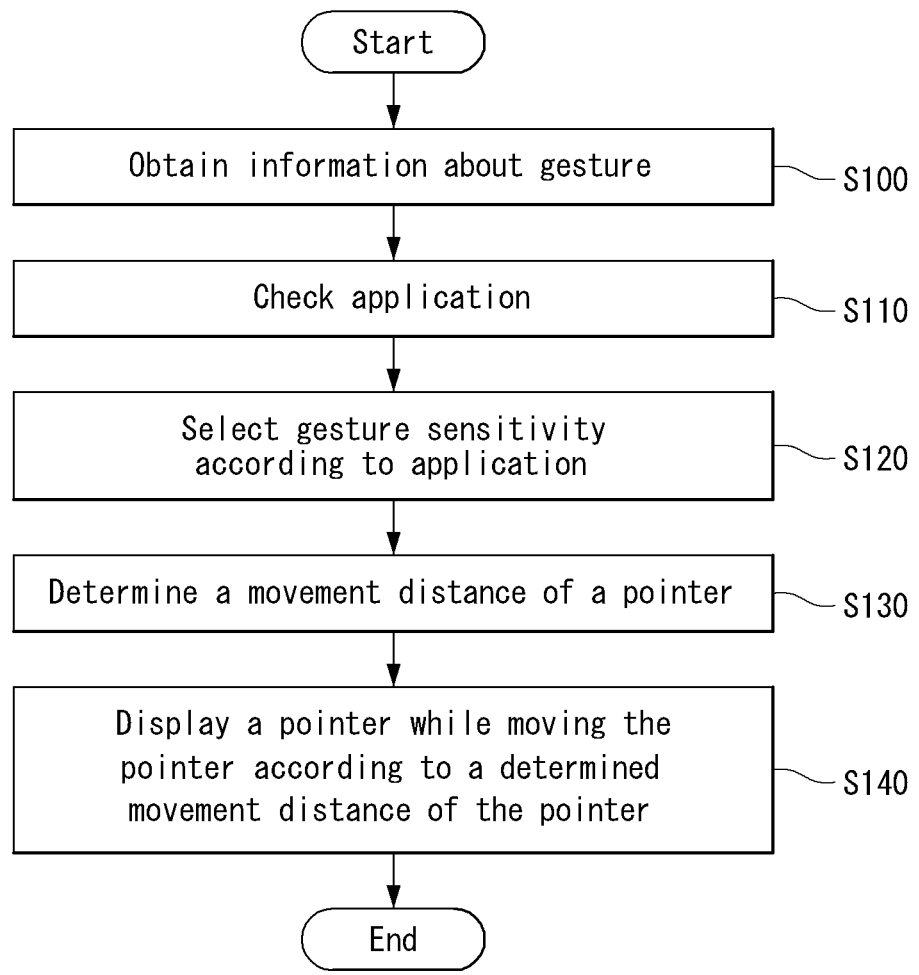
FIG. 9 is a flow diagram illustrating a method for controlling operation of an electronic device according to a first embodiment of the present invention.

FIG. 9 is a flow diagram illustrating a method for controlling operation of an electronic device according to a first embodiment of the present invention.

A method for controlling operation of an electronic device according to a first embodiment of the present invention comprises at least one step of obtaining information about a gesture S100, checking an application S110, selecting gesture sensitivity according to the application S120, determining a movement distance S130; and displaying a pointer and/or an object while moving the pointer and/or the object according to the determined movement distance S140. In what follows, each step will be described in detail.

The controller 180 can obtain information about a gesture S100.

The controller 180 can obtain information about a gesture as described with reference to FIG. 2. In other words, the controller 180 can obtain information about a gesture through the camera 121. At this time, the controller 180 can obtain not only the information about a movement in the left and right direction (namely, a movement in the x-y plane) but also the information about a movement in the forward and backward direction (namely, a movement along the z-axis). The camera 121 can consists of at least two or more cameras to obtain information about a movement of a gesture in the forward and backward direction but at the same time, a depth camera for obtaining information about a movement of a gesture in the forward and backward direction can be employed.

The controller 180 can check an application S110.

The step of S110 can be carried out before the step of S100 described above is carried out, at the same time as the step of S100 is carried out, and/or after the step of S100 is carried out.

The controller 180 can check an application being carried out in the electronic device 100. If multiple applications are running in the electronic device 100 (in other words, if the electronic device 100 is multitasking multiple applications), the controller 180 can check which application among the multiple applications the user wants to control. For example, if the OS running in the electronic device 100 is WINDOWS from MS, the controller 180 can check an application running in a currently active window from among multiple application windows. At this time, the controller 180 can also check the attribute about a depth range (DR) of the application.

In the case when each application is carried out separately, information output with a three-dimensional effect by the application and various graphic data (e.g., icons, a menu screen, etc.) can be output within a depth range (DR) different according to the application.

Figure 10:
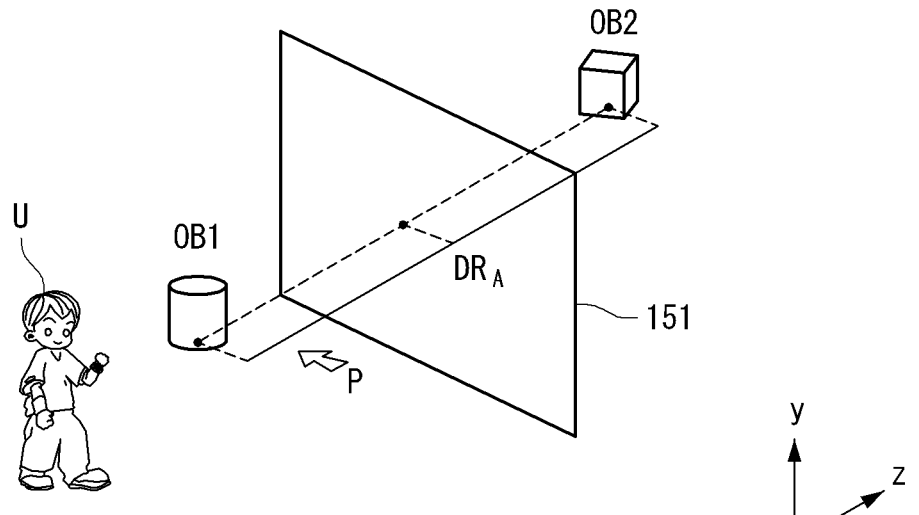
FIG. 10 illustrates a situation where information is displayed within a depth range different for each application.
Figure 10:
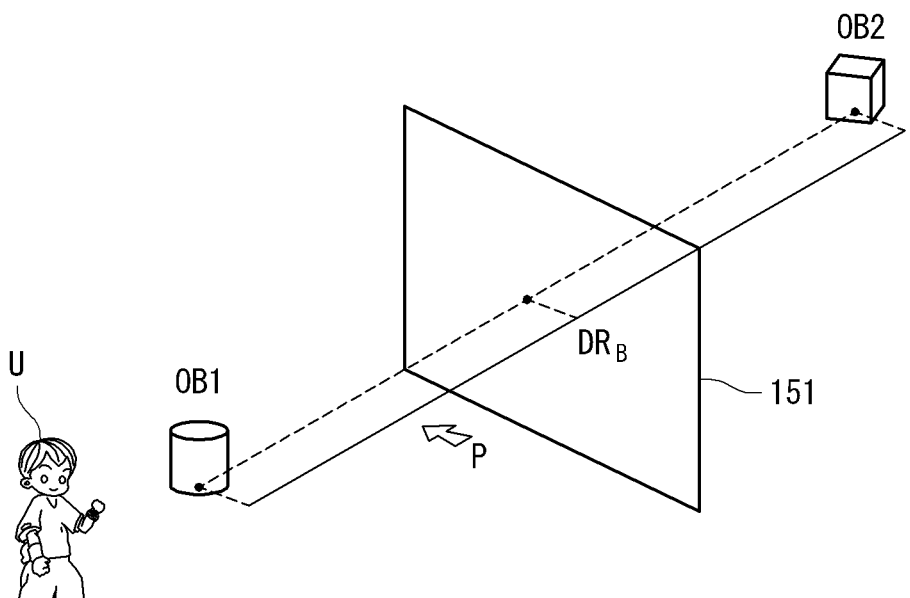

FIG. 10 illustrates a situation where information is displayed within a depth range different for each application. In particular, FIG. 10(a) illustrates a situation where various kinds of information are displayed with a three-dimensional effect at the time application A is carried out while FIG. 10(b) illustrates a situation where various kinds of information are displayed with a three-dimensional effect when application B is carried out.

With reference to FIG. 10, if application A is carried out, a depth range of application A is defined to be a first difference $DR_A$ between a first object OB1 which can be displayed most closely to the user (U) along the z-axis and a second object OB2 which can be displayed most distant from the user (U) along the z-axis. Similarly, if application B is carried out, a depth range of application B is defined to be a second difference $DR_B$ between a first object OB1 which can be displayed most closely to the user along the z-axis and a second object OB2 which can be displayed most distant from the user (U) along the z-axis.

As shown in FIG. 10, when information is displayed with a three-dimensional effect through the display unit 151 of the same electronic device 100, the information can be displayed with a different depth range depending on the application in question and the objective of the application instead of being displayed with the same depth range for each application. For example, some application can be designed to display information without a three-dimensional effect so that the user may not have a sense of depth at all (in other words, the corresponding depth range can be zero) while another application can display information with a depth range $DR_A$ as large as shown in FIG. 10(a). Still another application can display information with a depth range $DR_B$ as large as shown in FIG. 10(b).

The controller 180 can select gesture sensitivity according to an application S120.

Figure 11:
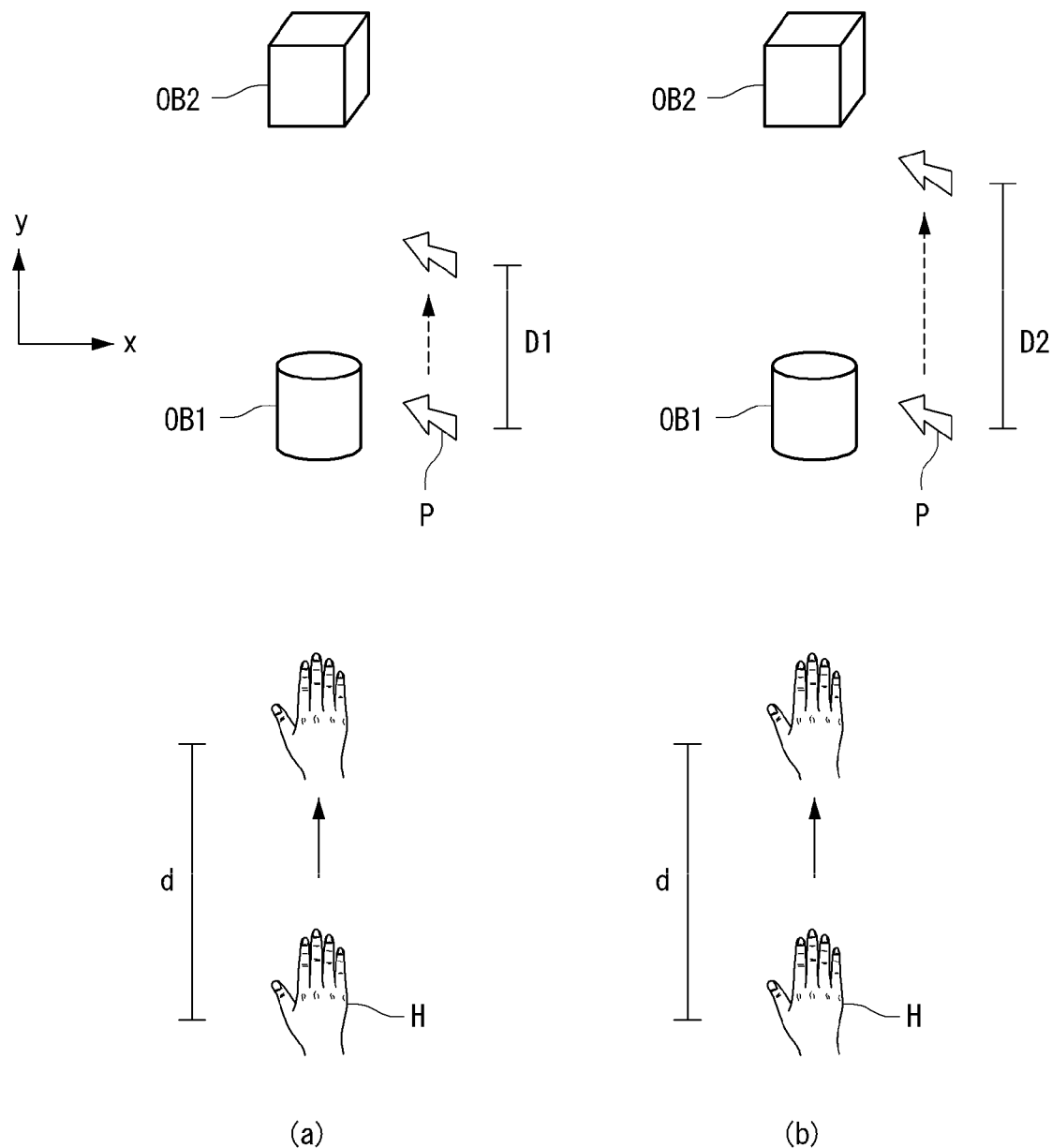
FIG. 11 illustrates gesture sensitivity according to a first embodiment of the present invention.

FIG. 11 illustrates gesture sensitivity according to a first embodiment of the present invention. In particular, FIG. 11(a) illustrates how the display unit 151 operates to output a three-dimensional screen according to first gesture sensitivity and FIG. 11(b) illustrates how the display unit 151 operates to output a three-dimensional screen according to second gesture sensitivity.

FIGS. 11(a) and (b) illustrate a situation where a first object OB1 and a second object OB2 are displayed through the display unit 151 and a pointer P is displayed along with the first and the second object OB1, OB2.

At this time, if the user makes a gesture by move his or her hand (H) along the z-axis uniformly by d, according to first gesture sensitivity (FIG. 11(a)), a pointer P moves along the z-axis by D1 due to the user's gesture making the movement of d while according to second gesture sensitivity (FIG. 11(b)), the pointer P moves along the z-axis by D2 due to the user's gesture making the movement of d.

In other words, gesture sensitivity indicates how sensitively a pointer P and/or objects OB1, OB2 displayed through the display unit 151 respond to the user's gesture and moves. The gesture sensitivity can be expressed by the following equations.

$$D/d \propto \text{gesture sensitivity} \qquad (EQ. 1)$$

or $$d/D \propto \text{gesture sensitivity} \qquad (EQ. 2),$$

where D is a movement distance of an object and/or a pointer and d is a movement distance due to the corresponding gesture.

EQ. 1 defines gesture sensitivity to be proportional to the ratio of a movement distance of a gesture to that of an object and/or a pointer while EQ. 2 defines to be proportional to the ratio of a movement distance of an object and/or a pointer to that of a gesture; therefore, either definition for gesture sensitivity can be employed. However, it is assumed that the gesture sensitivity is expressed by EQ. 1 in the following description of the present invention. In other words, it should be understood in the following that larger gesture sensitivity indicates a larger movement distance of a pointer and/or an object than that of the corresponding gesture.

Meanwhile, descriptions about gesture sensitivity with reference to FIG. 11 have been made with an example where an object and/or a pointer moves along the z-axis according to the movement of the user's gesture along the z-axis; that has been made only for the convenience of description and the same principles for gesture sensitivity can be applied to the x and the y-axis. Put differently, gesture sensitivity can be defined for all the three axes of the Cartesian coordinate system defined in three-dimensional space. In general cases, it can be assumed that gesture sensitivity along the x-axis, gesture sensitivity along the y-axis, and gesture sensitivity along the z-axis are defined in the same way. However, gesture sensitivity along each axis does not necessarily have the same value; gesture sensitivity along each axis can have a different value from one another. In what follows, unless stated otherwise, it is assumed that the phrase of gesture sensitivity covers all the gesture sensitivities along the respective axes.

Figure 13:
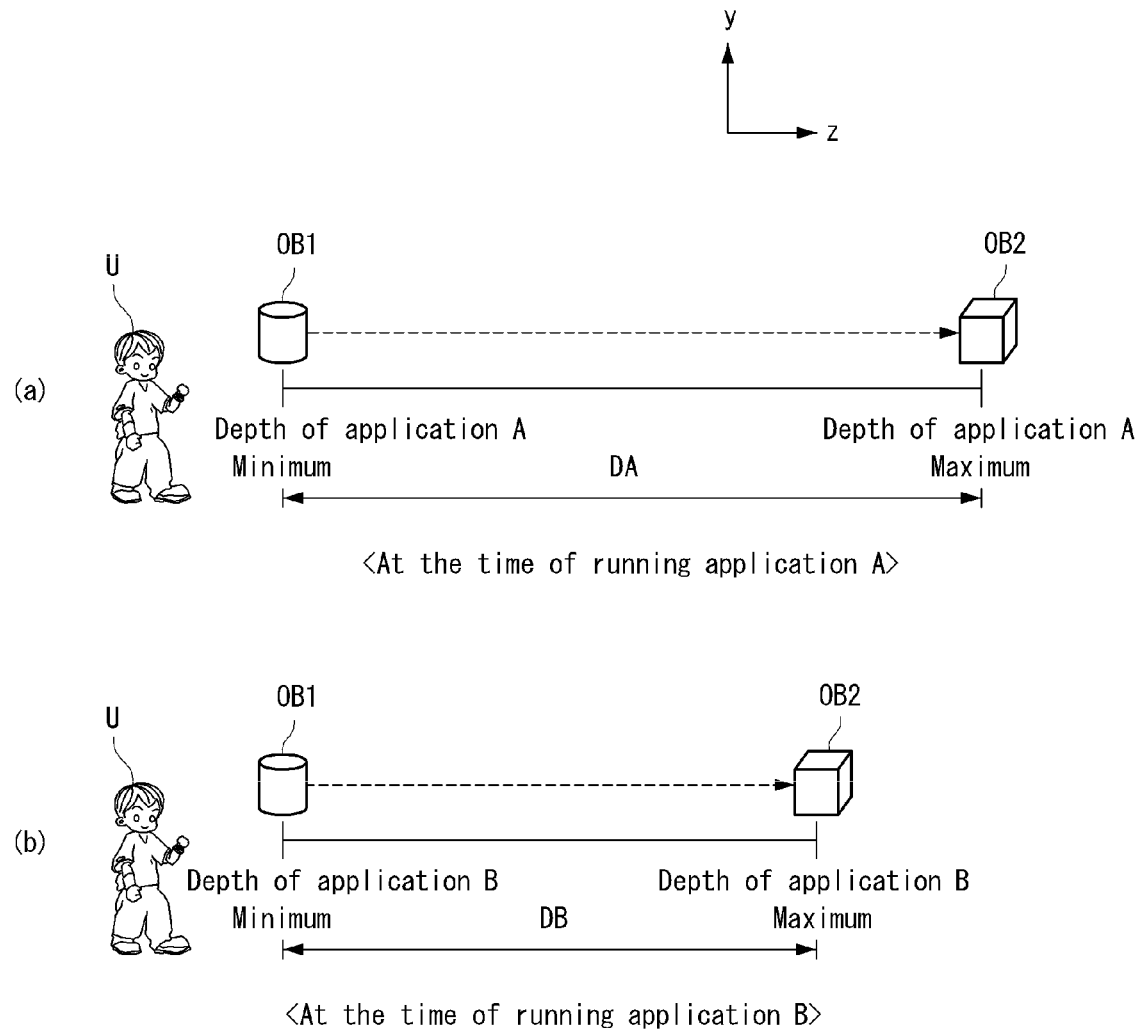
FIG. 13 illustrates a minimum depth and a maximum depth according to a first embodiment of the present invention.

Again, with reference to FIG. 9, the controller 180 can select different gesture sensitivity according to an application checked at the step of S110. In the following, various embodiments for selecting gesture sensitivity will be described in detail with reference to FIGS. 12 and 13. FIG. 12 is a table showing applications according to a first embodiment of the present invention and their corresponding gesture sensitivity. FIG. 13 illustrates a minimum depth and a maximum depth according to a first embodiment of the present invention.

First, the controller 180, by checking gesture sensitivity already defined for an application, can select the checked gesture sensitivity at the step of S120. For example, as shown in FIG. 12, by referring to a table showing applications and their associated gesture sensitivity, can select gesture sensitivity.

Second, the controller 180 can select gesture sensitivity adaptively according to the depth implemented by an application.

First, with reference to FIG. 13, a depth implemented by an application will be described. FIGS. 13(*a*) and (*b*) illustrates a situation where a first object OB1 and a second object OB2 are displayed in three-dimensional space through the display unit 151. In particular, FIG. 13(*a*) outputs the first object OB1 at a minimum depth and the second object OB2 at a maximum depth in the case when an application A is carried out while FIG. 13(*b*) outputs the first object OB1 at a minimum depth and the second object OB2 at a maximum depth in the case when an application B is carried out.

At this time, a minimum depth is defined as the distance between the position of an object displayed most closely to the user and a reference point when an image is displayed with a three-dimensional effect through the display unit 151 while a maximum depth is defined as the distance between the position of an object displayed most distant from the user and a reference position. The reference point can be an arbitrary point on a straight line passing through the first OB1 and the second object OB2 and being perpendicular to the x-y plane (namely, the screen of the display unit 151). For example, the reference point can be the user (U) shown in FIGS. 13(*a*) and (*b*).

Also, similar to the description above, a 'depth range' corresponding to a particular application is defined to be the difference between a minimum depth and a maximum depth implemented by the particular application. In other words, with reference to FIGS. 13(*a*) and (*b*), the depth range of an application A is defined to be DA while the depth range of an application B is defined to be DB. At this time, it can be said that the depth range of the application A is larger than that of the application B (DA>DB).

In this case, the controller 180, after checking the depth range of an application checked at the step of S110, can select gesture sensitivity adaptively according to the checked depth range. For example, the controller 180 can set the gesture sensitivity to be a for the application A having a depth of DA while setting the gesture sensitivity to be b (b<a) for the application B having a depth of DB (DB<DA). In other words, the controller 180 can select larger gesture sensitivity for an application having a larger depth range.

Next, the controller 180, by taking account of gesture sensitivity selected at the step of S120, can determine a movement distance of an object and/or a pointer S130 according to the information about the gesture obtained from the step of S100.

Figure 14:
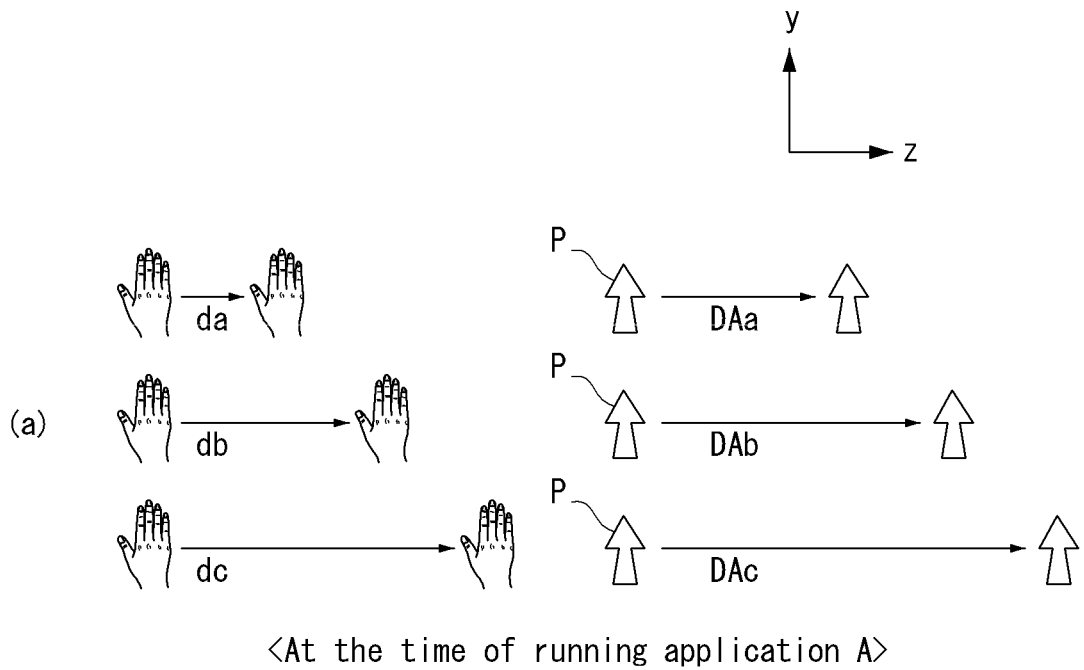
FIG. 14 illustrates a situation where a movement distance of an object and/or a pointer is determined by the user's gesture and gesture sensitivity according to a first embodiment of the present invention.
Figure 14:
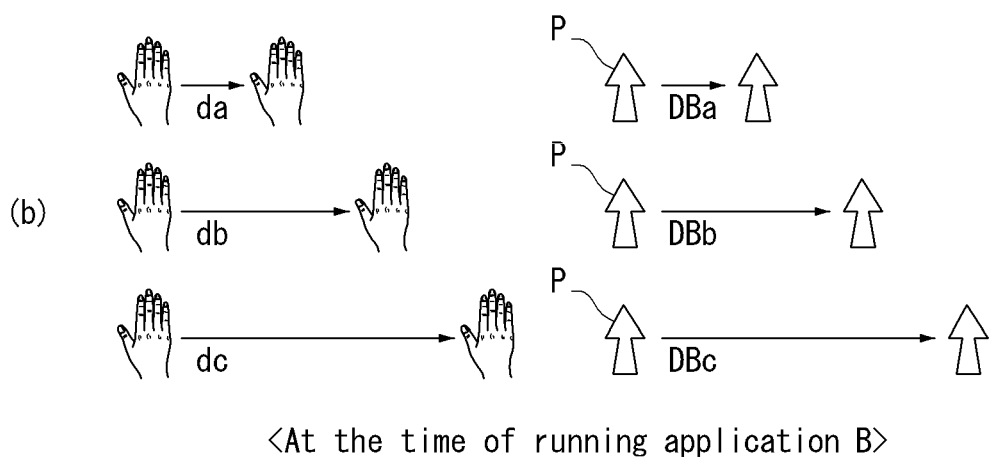

FIG. 14 illustrates a situation where a movement distance of an object and/or a pointer is determined by the user's gesture and gesture sensitivity according to a first embodiment of the present invention.

FIG. 14(*a*) illustrates a movement distance of an object and/or a pointer due to the user's gesture when larger gesture sensitivity is selected and FIG. 14(*b*) illustrates a movement distance of an object and/or a pointer due to the user's gesture when smaller gesture sensitivity is selected.

As shown in FIG. 14(*a*), the controller 180 can determine the movement distance of a pointer P along the z-axis to be DAa when the user moves his or her hand H along the z-axis by da, while the movement distance of the pointer P can be determined to be DAb (DAc) along the z-axis for the movement of the user's hand H by db (dc).

Meanwhile, if smaller gesture sensitivity is selected than that of FIG. 14(*a*), the controller 180 can determine the movement distance of the pointer P along the z-axis to be DBa (DBa<DAa) when the user moves his or her hand H along the z-axis by da while the movement distance of the pointer P along the z-axis can be determined to be DBb (DBb<DAb) for the movement of the user's hand H by db along the z-axis. And the movement distance of the pointer P along the z-axis can be determined to be DBc (DBc<DAc) for the movement of the user's hand H by dc along the z-axis.

Next, the controller 180 can display the pointer while moving the pointer along a determined movement distance of the pointer S140.

The steps of S100 to S140 according to the first embodiment of the present invention can be repeated with a predetermined period. For example, the steps above can be repeated with a period of one second or with a period of 0.1 second. As the period with which those steps are carried out is shortened, the movement speed of an object and/or a pointer in response to the user's gesture will be made faster.

The steps of S120 and S130 above have been described mostly based on a depth range of an application and a movement distance of the user's gesture along the z-axis but the first embodiment of the present invention is not limited only to the above.

For example, gesture sensitivity for the x-axis and/or the y-axis can be selected by considering the aspect ratio of the x and the y axis of a screen implemented by an application. In other words, in a screen implemented by an application checked at the step of S110, gesture sensitivity along the x-axis and gesture sensitivity along the y-axis can be selected so that the ratio of the length along the x-axis of the screen to the length along the y-axis of the screen (length along the y-axis/length along the x-axis) is proportional to the ratio of the gesture sensitivity along the x-axis and the gesture sensitivity along the y-axis.

In another example, gesture sensitivity along the x-axis, y-axis, and/or z-axis can be selected by taking account of the resolution along the x, y, and z axis of a screen implemented by an application. In other words, the gesture sensitivity for each axis can be selected to be (inversely) proportional to the resolution of each axis. For instance, for an application having larger resolution along the z-axis, the controller 180 can select smaller (or larger) gesture sensitivity along the z-axis.

In other words, the sensitivity along the x-axis, the y-axis, and the z-axis can be selected to be different from one another.

According to the first embodiment of the present invention, since larger gesture sensitivity can be selected for an application having a larger depth range, the movement distance of an object and/or a pointer due to the movement distance of the same gesture of the user can be made larger. Therefore, even if an application having a larger depth range is carried out, an inconvenience of the user's having to move his or her hand H much more along the z-axis (in the case where the user gesture corresponds to a hand gesture) to move an object and/or a point from a minimum depth to a maximum depth can be relieved.

Second Embodiment

A method for controlling operation of an electronic device according to a second embodiment of the present invention will be described with reference to FIGS. 15 to 19.

Figure 15:
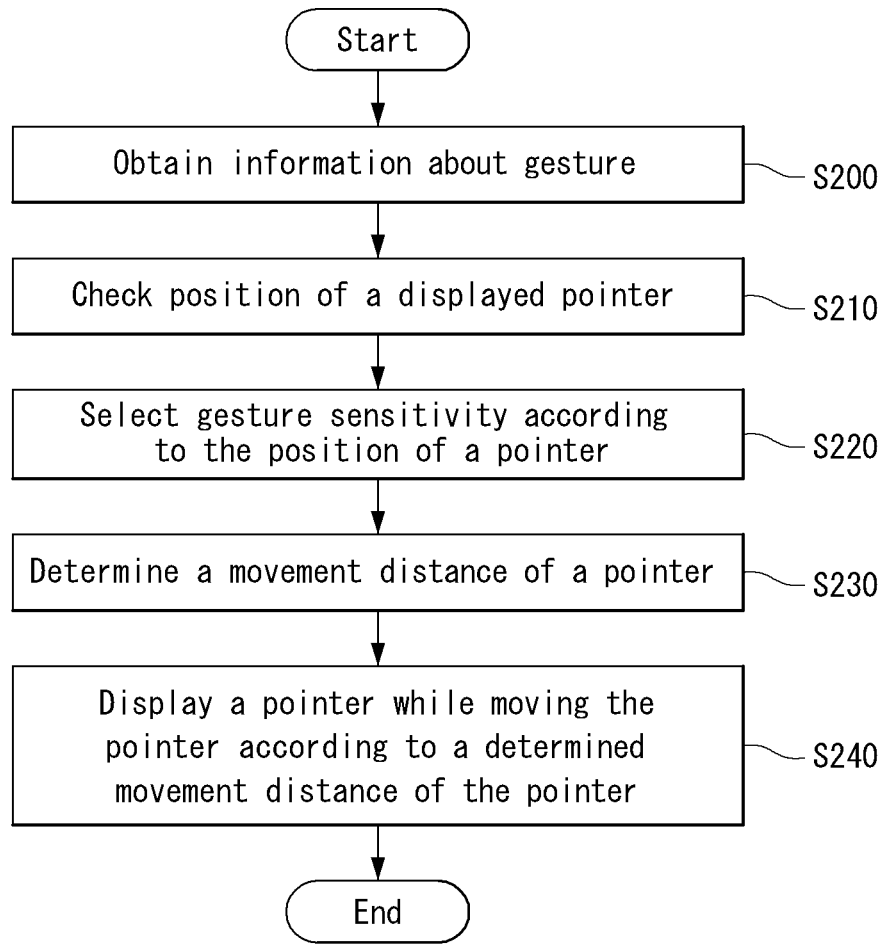
FIG. 15 is a flow diagram illustrating a method for controlling operation of an electronic device according to a second embodiment of the present invention.

FIG. 15 is a flow diagram illustrating a method for controlling operation of an electronic device according to a second embodiment of the present invention.

A method for controlling operation of an electronic device according to a second embodiment of the present invention comprises at least one step of obtaining information about a gesture S200, checking the position of a displayed pointer (or an object) S210, selecting gesture sensitivity according to the position of the pointer S220, determining a movement distance S230; and displaying a pointer and/or an object while moving the pointer and/or the object according to the determined movement distance S240.

Since the steps of S200, S230, and S240 are identical or similar to the steps of S100, S130, and S140 described in the first embodiment, detailed descriptions will not be provided here. In addition, descriptions and/or definitions about gesture sensitivity, minimum depth, maximum depth, and depth range of an application will be applied the same for the second embodiment. In what follows, descriptions will be concentrated on the steps of S210 and S220.

The controller 180 can check the position of a pointer and/or an object displayed S210. The step of S210 can be carried out before the step of S200 is carried out, at the same time as the step of S200 is carried out, and/or after the step of S200 is carried out.

The controller 180 can check the position of a pointer and/or an object displayed through the display unit 151. If the user wants to move the position of the pointer through a gesture, the controller 180 can check the position of the pointer while if the user wants to move an object through a gesture, the controller 180 can check the position of the object in question. The controller 180 can determine previously whether the user wants to move a pointer or an object through his or her gesture before carrying out the step of S200 and/or S210 through interaction with the user. On the other hand, a target that the user wants to move by using his or her gesture can be determined according to the information about a gesture obtained at the step of S200 or according to whether the gesture is intended to move a pointer or a particular object.

The controller 180 can check the spatial coordinates of the position at which the pointer and/or the object is located in virtual three-dimensional space displayed through the display unit 151.

Next, the controller 180 can select gesture sensitivity according to the position of the pointer and/or the object S220. The step of S220 will be described with reference to FIGS. 16 to 18.

Figure 16:
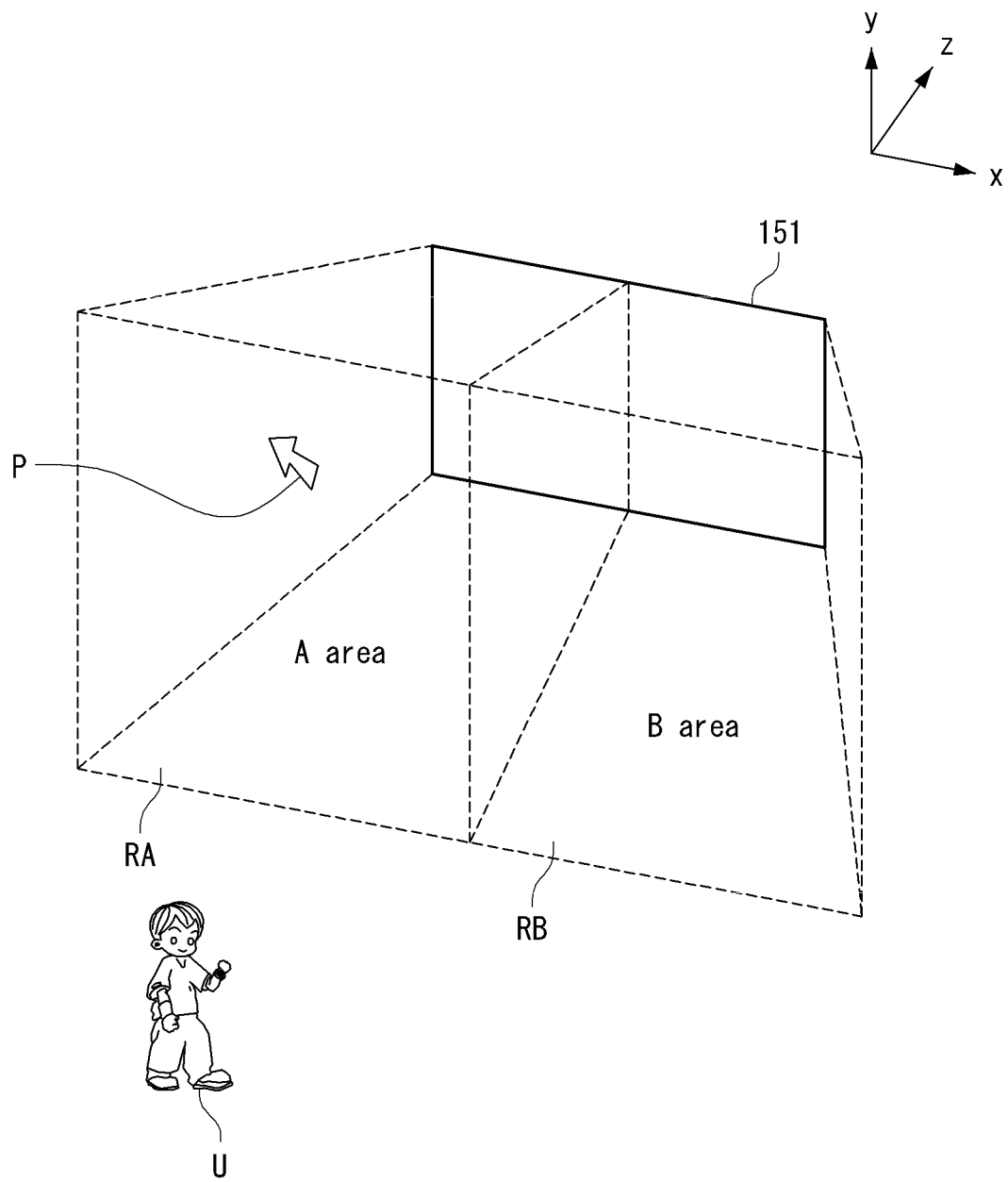
FIGS. 16 to 18 illustrate a method for selecting gesture sensitivity according to the position of a pointer and/or an object according to a second embodiment of the present invention.
Figure 17:
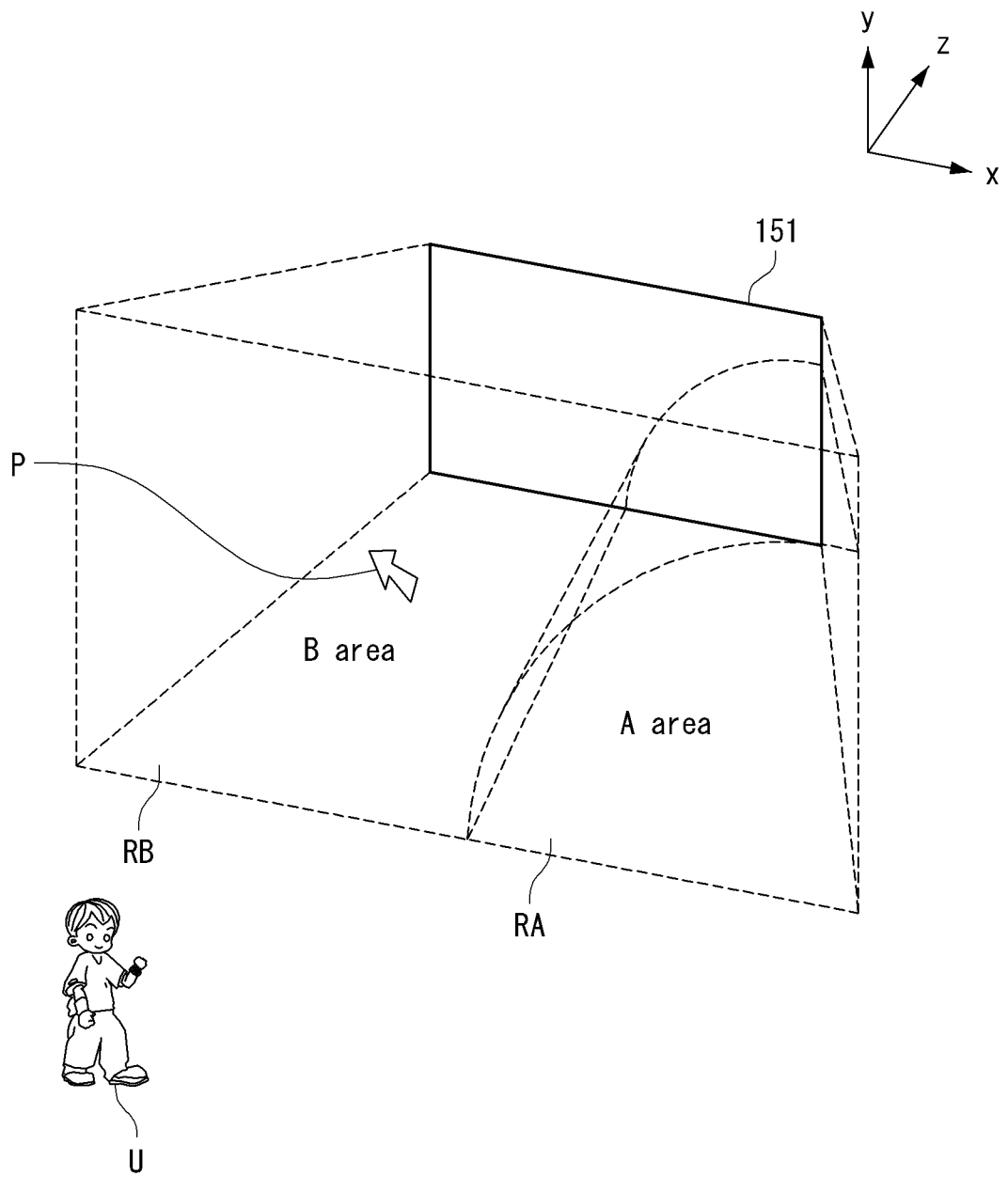
Figure 18:
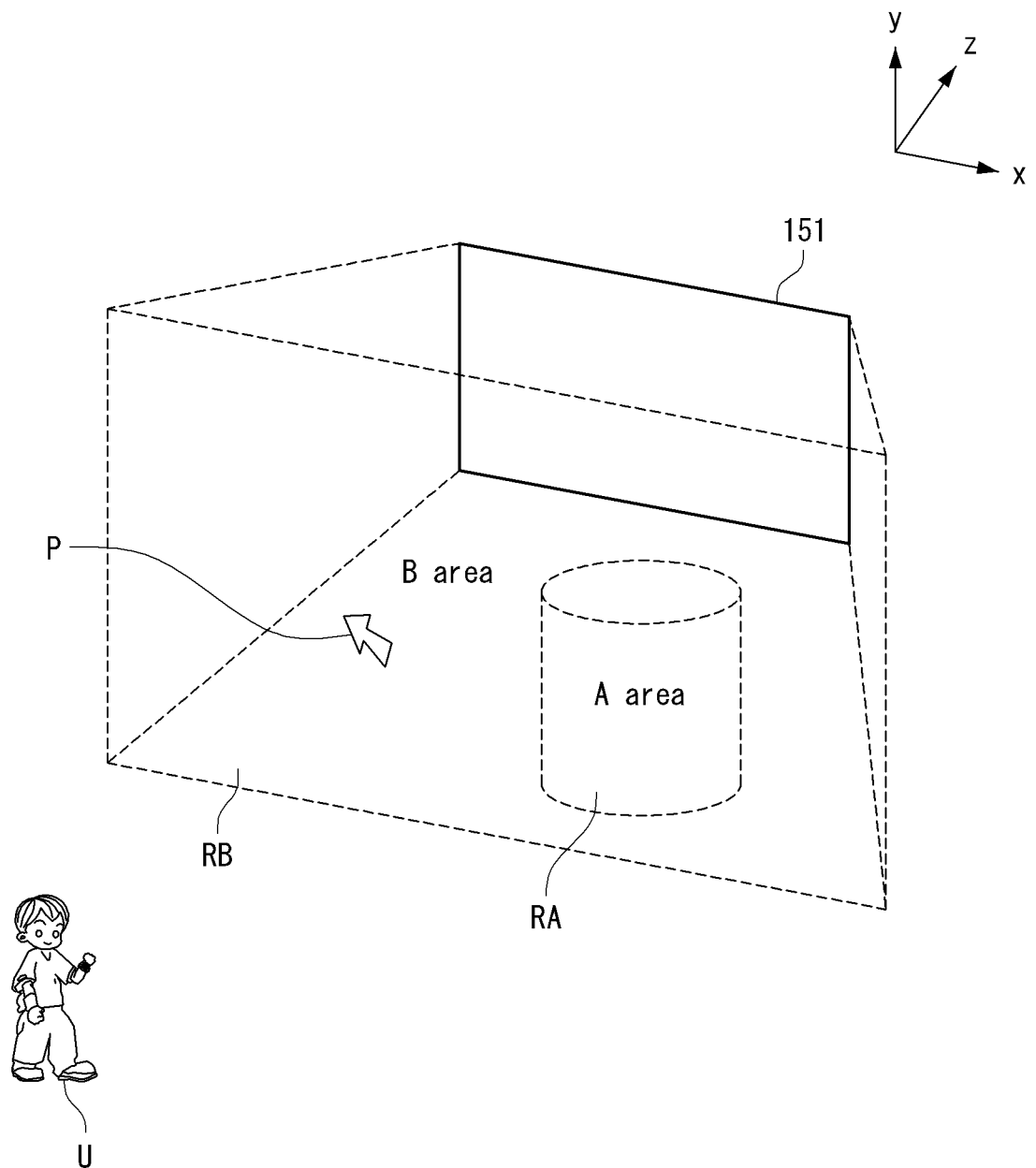

FIGS. 16 to 18 illustrate a method for selecting gesture sensitivity according to the position of a pointer and/or an object according to the second embodiment of the present invention.

Depending on the conditions, an electronic device 100, at the time of displaying a three-dimensional screen through the display unit 151, can apply different gesture sensitivities to two separate areas located in virtual three-dimensional space formed by displaying the three-dimensional screen.

As shown in FIG. 16, the virtual three-dimensional space can be divided into A area RA and B area RB. In moving a pointer and/or an object located within A area RA and B area RB according to the user's gesture, gesture m sensitivity applied to the A area RA can be different from that for the B area RB.

An example of dividing a three-dimensional screen displayed by the display unit 151 into two areas to which different gestures are applied respectively can include not only the case where the three-dimensional screen is divided into the left and right half as shown in FIG. 16 but also the case where the screen is divided in various ways as shown in FIGS. 17 and 18. Meanwhile, the example is not limited only to the case where the three-dimensional screen displayed by the display unit 151 is divided into two separate areas and different gesture sensitivities are applied for the respective areas but can also include a case where the three-dimensional screen is divided into three or more areas and different gesture sensitivities are applied for each of the divided areas.

As described above, gesture sensitivities applied to separate areas of a three-dimensional screen displayed by the display unit 151 of the electronic device 100 can be different from each other, which can occur when different gesture sensitivity is set up for each area by an application being carried out by the electronic device 100. For example, if the application being carried out by the electronic device 100 corresponds to a three-dimensional game application and it is intended for the user to have a vivid experience in a virtual game environment by applying different gesture sensitivities to separate areas, different gesture sensitivities can be applied to the separate areas of the three-dimensional screen even for a single application.

In addition, the above situation can happen when two applications are being carried out by the electronic device 100 (namely, two applications are multitasked); screens corresponding to the two applications are being displayed respectively in A area RA and B area RB; and gesture sensitivities selected by the two applications are different from each other. For example, if a three-dimensional screen for application A described in the first embodiment is displayed through A area RA and a three-dimensional screen for application B described in the first embodiment is displayed through B area RB, the gesture sensitivity for the application A and the gesture sensitivity for the application B can be selected differently from each other.

Accordingly, the controller 180 checks whether the position of a pointer and/or an object checked at the step of S210 belongs to A area RA or B area RB; and can select gesture sensitivities for the two area differently. In what follows, various embodiments for selecting gesture sensitivity according to the position of a pointer and/or an object will be described in detail.

Figure 19:
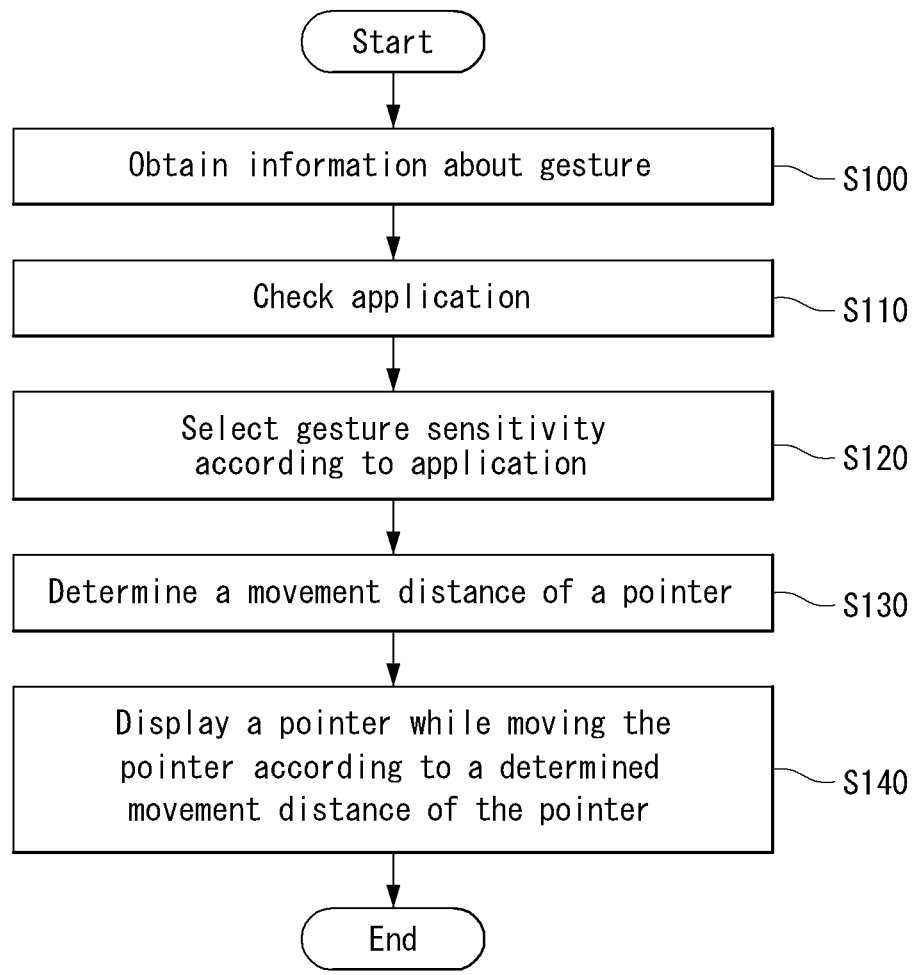
FIG. 19 is a table showing applications and their corresponding gesture sensitivity.

First, the controller 180 can check gesture sensitivity already assigned to the area to which the position of a pointer and/or an object belongs; and select the checked gesture sensitivity at the step of S220. For example, as shown in FIG. 19, by referring to a table showing applications and their associated gesture sensitivity, the controller 180 can select gesture sensitivity. Such an embodiment can be applied to the case where different gesture sensitivities are applied to the respective areas of a three-dimensional screen divided by a single application.

Second, the controller 180 can select gesture sensitivity adaptively according to a depth range implemented by an application corresponding to the area to which the position of a pointer and/or an object belongs. A method for selecting gesture sensitivity adaptively according to a depth range implemented by an application has already been described in the first embodiment; therefore, detailed description about the method will be omitted.

Next, the controller 180 can carry out the steps of S230 and S240.

As described previously in the first embodiment, the steps of S200 to S240 according to the second embodiment of the present invention can be carried out repeatedly with a predetermined period (e.g., 1 second or 0.1 second). As the period with which those steps are carried out is shortened, the movement speed of an object and/or a pointer in response to the user's gesture will be made faster.

According to the second embodiment of the present invention, different gesture sensitivities can be established for separate areas of virtual three-dimensional space displayed through the display unit; a possibility of providing more various user interfaces from a single application can be increased; and if two or more applications are multitasked through a single display unit, displayed objects can be made to respond to the user's gesture according to gesture sensitivity more relevant for each application, thereby improving user convenience much more.

Third Embodiment

A method for controlling operation of an electronic device according to a third embodiment of the present invention will be described with reference to FIGS. 20 and 21.

Figure 20:
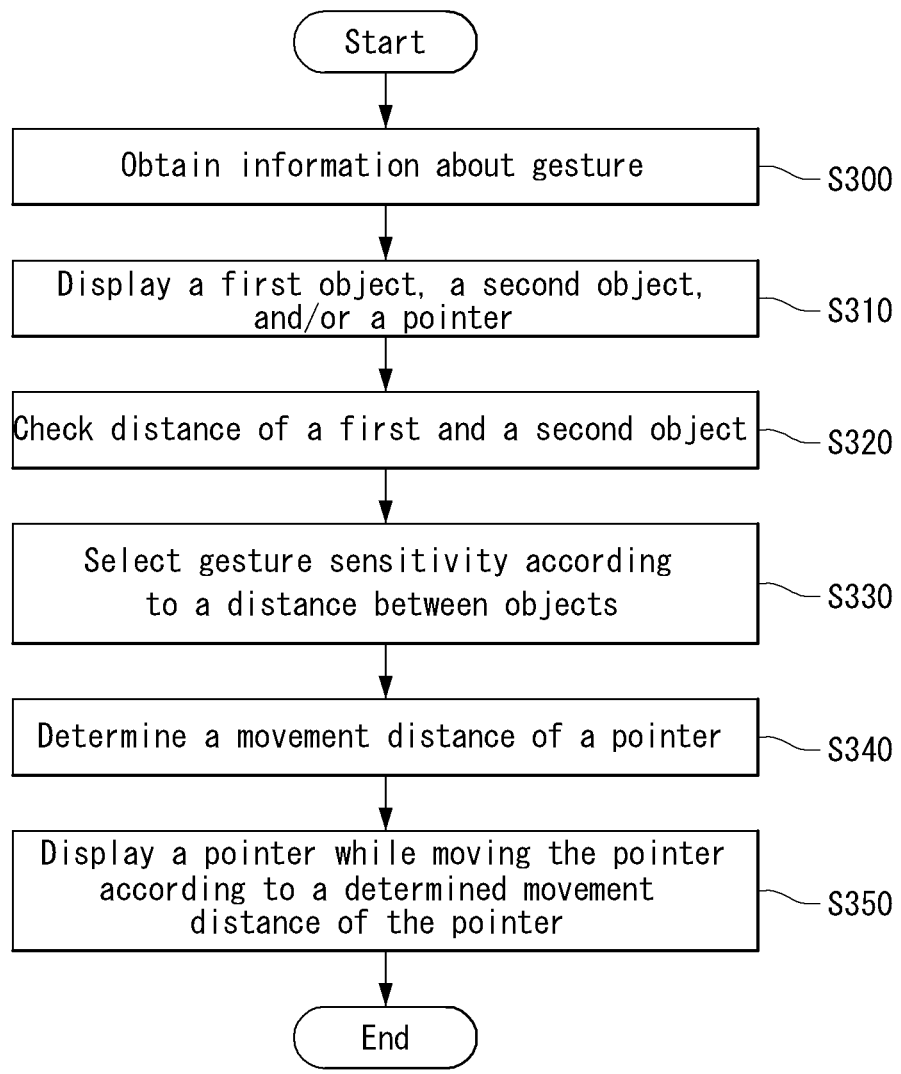
FIG. 20 is a flow diagram illustrating a method for controlling operation of an electronic device according to a third embodiment of the present invention.

FIG. 20 is a flow diagram illustrating a method for controlling operation of an electronic device according to a third embodiment of the present invention.

A method for controlling operation of an electronic device according to a third embodiment of the present invention comprises at least one step of obtaining information about a gesture S300; displaying a first object, a second object, and/or a pointer S310; checking distance of the first and the second object S320; selecting gesture sensitivity according to the distance between the first and the second object S330; determining a movement distance S340; and displaying a pointer and/or an object while moving the pointer and/or the object according to the determined movement distance S350.

Since the steps of S300, S340, and S350 are identical or similar to the steps of S100, S130, and S140 described in the first embodiment, detailed descriptions will not be provided here. In addition, descriptions and/or definitions about gesture sensitivity, minimum depth, maximum depth, and depth range of an application will be applied the same for the third embodiment. In what follows, descriptions will be concentrated on the steps of S310, S320, and S330 with reference to FIG. 21.

Figure 21:
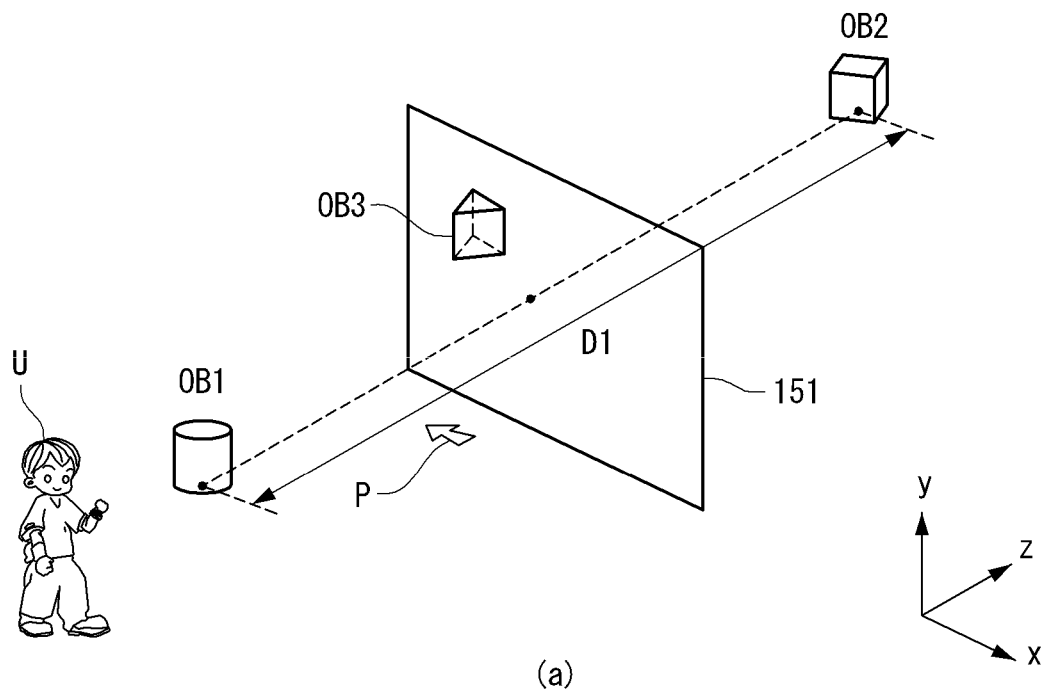
FIG. 21 illustrates a method for operating an electronic device according to a third embodiment of the present invention.
Figure 21:
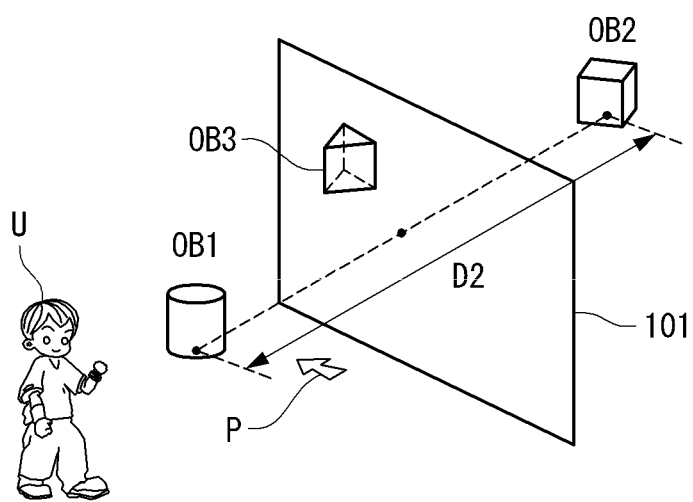

FIG. 21 illustrates a method for operating an electronic device according to a third embodiment of the present invention. FIGS. 21(*a*) and (*b*) all illustrate a situation where a first object OB1, a second object OB2, a third object OB3, and a pointer P are displayed through the display unit 151.

As shown in FIG. 21, the controller 180 can display multiple objects OB1, OB2, OB3 and/or a pointer P S310. Although FIG. 21 illustrates a situation where three objects are displayed, the controller 180 can output four or more objects through the display unit 151; similarly, the controller 180 can output two objects through the display unit 151.

The controller 180 can check the distance of the first object OB1 and the second object OB2 S320.

If it is the case that the number of objects displayed through the display unit 151 is two, one of them is assigned to be a first object OB1 while the other a second object OB2.

If the number of objects displayed through the display unit 151 is three or more, the controller 180 can determine an object displayed most closely to the user U to be a first object OB1 while the controller 180 can determine an object displayed most distant from the user U to be a second object OB2.

The controller 180 can check the distance between the determined first OB1 and second object OB2. When objects OB1, OB2, OB3, and a pointer P are displayed in three-dimensional space as shown in FIG. 21(*a*), the controller 180 can check that the distance between the first and the second object OB1, OB2 corresponds to D1; if objects OB1, OB2, OB3, and a pointer P are displayed in three-dimensional space as shown in FIG. 21(*b*), the controller 180 can check that the distance between the first and the second object OB1, OB2 corresponds to D2.

The controller 180 can select gesture sensitivity according to the distance between the first and the second object OB1, OB2 S330.

As the distance between the first and the second object OB1, OB2 becomes larger, the controller 180 can select a larger gesture sensitivity.

For example, when objects OB1, OB2, OB3 are displayed as shown in FIG. 21(*a*) and they are compared with the case where objects OB1, OB2, OB3 are displayed as shown in FIG. 21(*b*), since the distance between the first and the second object OB1, OB2 of FIG. 21(*a*) is larger than that of FIG. 21(*b*), the controller 180 can select a larger gesture sensitivity than that of FIG. 21(*a*).

Next, the controller 180 can carry out the steps of S340 and S350.

As described in the first embodiment, the steps of S300 to S350 according to the third embodiment of the present invention can be carried out repeatedly with a predetermined period (e.g., 1 second or 0.1 second). As the period with which those steps are carried out is shortened, the movement speed of an object and/or a pointer in response to the user's gesture will be made faster.

Meanwhile, description about checking the distance between the first and the second object OB1, OB2 at the step of S320 has been made only by using the distance among objects along the z-axis; but the third embodiment of the present invention is not limited to the above situation.

In other words, the distance among objects along the z-axis functions as a factor for gesture sensitivity along the z-axis; in the same way, the distance among the objects along the x-axis and the distance among the objects along the y-axis function as factors for gesture sensitivities along the x and y-axis, respectively.

It should be noted that for the convenience of design, if gesture sensitivity for one axis is determined, gesture sensitivities for the other axes can be set up to be the same as the already determined gesture sensitivity for the one axis. For example, gesture sensitivity having the largest value among gravity sensitivities can be applied to the respective axes; on the contrary, gesture sensitivity having the smallest value can be applied to the respective axes.

Also, only the gesture sensitivity for a single axis can be selected adaptively according to the steps of S300 to S350 while gesture sensitivities for the other axes are not changed adaptively.

According to the third embodiment of the present invention, when multiple objects are displayed through the display unit, since gesture sensitivity can be selected/established differently according to the distance among objects, an inconvenience of the user's having to move his or her hand H much more when the user attempts to move a pointer from an object displayed most closely to an object displayed most distantly can be relieved even when the objects are separated far away from one another. Also, since different gesture sensitivity can be established according to the distance among objects in virtual three-dimensional space, a possibility of providing more various user interfaces can be increased.

Fourth Embodiment

A method for controlling operation of an electronic device according to a fourth embodiment of the present invention will be described with reference to FIGS. 22 and 23.

Figure 22:
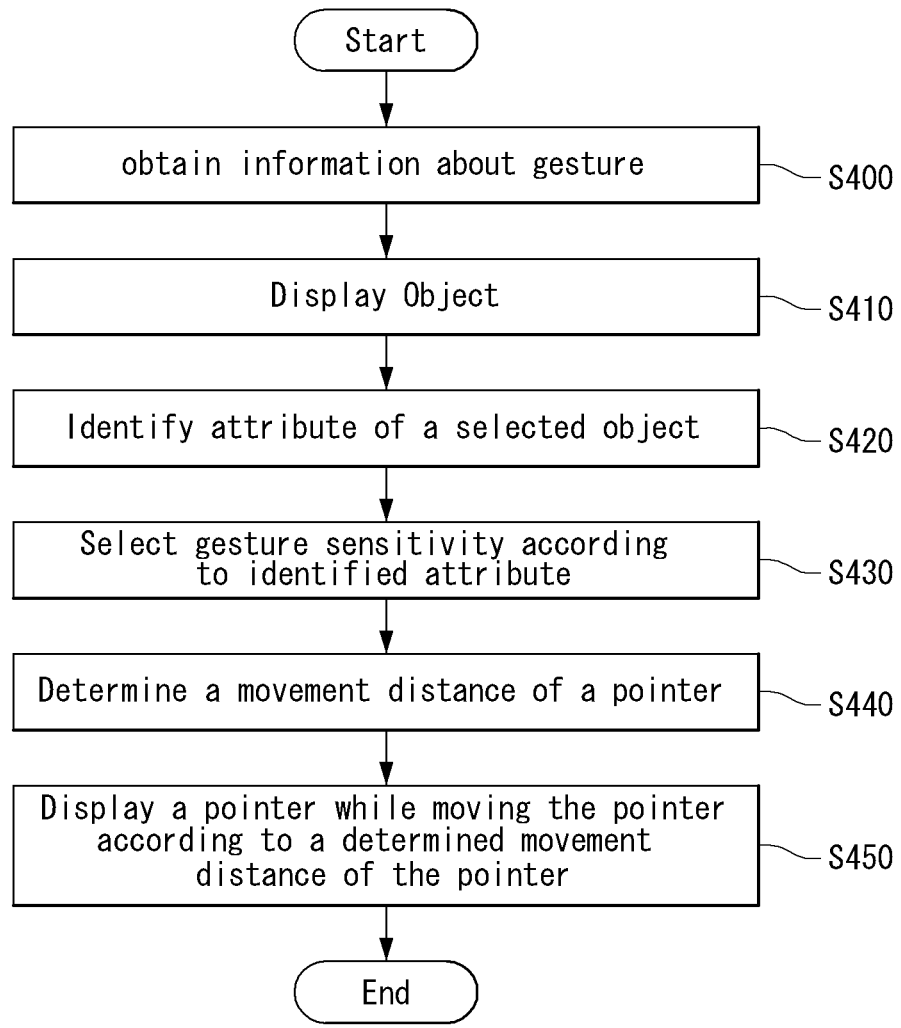
FIG. 22 is a flow diagram illustrating a method for controlling operation of an electronic device according to a fourth embodiment of the present invention.

FIG. 22 is a flow diagram illustrating a method for controlling operation of an electronic device according to a fourth embodiment of the present invention.

A method for controlling operation of an electronic device according to a fourth embodiment of the present invention comprises at least one step of obtaining information about a gesture S400, displaying at least one object S410, checking attributes of the selected object S420, selecting gesture sensitivity according to the checked attributes S430, determining a movement distance S440, and displaying a pointer and/or an object while moving the pointer and/or the object according to the determined movement distance S450.

Since the steps of S400, S440, and S450 are identical or similar to the steps of S100, S130, and S140 described in the first embodiment, detailed descriptions will not be provided here. In addition, descriptions and/or definitions about gesture sensitivity, minimum depth, maximum depth, and depth range of an application will be applied the same for the third embodiment. In what follows, descriptions will be concentrated on the steps of S410, S420, and S430 with reference to FIG. 23.

Figure 23:
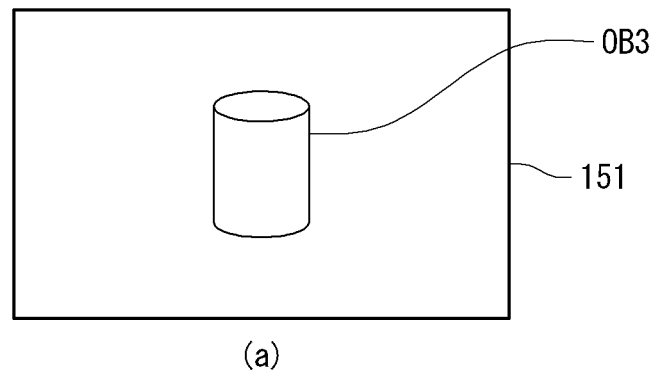
FIG. 23 illustrates a method for operating an electronic device according to a fourth embodiment of the present invention.
Figure 23:
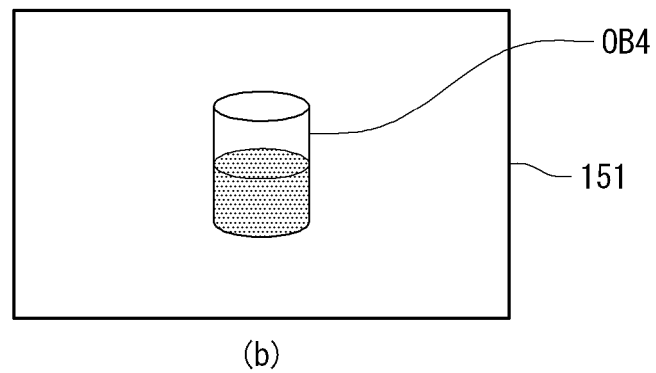
Figure 23:
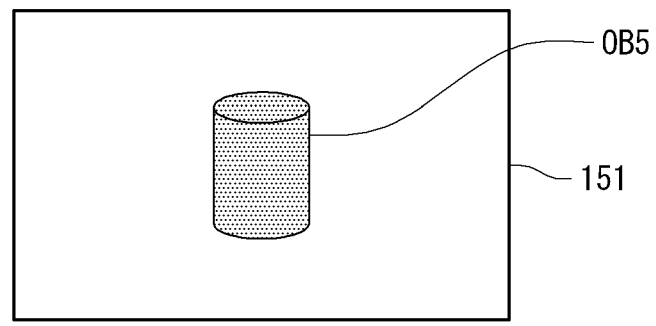

FIG. 23 illustrates a method for operating an electronic device according to a fourth embodiment of the present invention.

The controller 180 can display at least one object S410. The displayed at least one object can have attributes corresponding to the object. The attributes corresponding to the object can be varied significantly according to the type of the object.

For example, if the object corresponds to a file, the file size can correspond to the attribute of the object.

In another example, if the object corresponds to a file folder, the number of files included in the file folder, the amount of total files, etc. can be the attributes possessed by the object.

In still another example, if the object corresponds to an object indicating remaining battery capacity of the power supply 190 (e.g., a battery), the remaining capacity of the battery can be the attribute of the object.

In yet another example, if the object corresponds to a mail application, the number of unread mails can be the attribute possessed by the object.

FIG. 23(a), (b), and (c) show objects having attributes different from one another. The objects OB3, OB4, OB5 shown in FIG. 23 are objects indicating remaining battery capacity of an electronic device; FIG. 23(a) illustrates an object OB3 indicating the state where very little battery capacity is remained; FIG. 23(b) illustrates an object OB4 indicating the state where about half of the battery capacity is remained; and FIG. 23(c) illustrates an object OB5 indicating the state where the battery is almost fully charged. In this way, the controller 180 can display objects having attributes.

At this time, the controller 180 can check the attribute of a selected object S420. To give an example with reference to FIG. 23, the controller 180 can check whether the attribute of a selected object (namely, the object indicating remaining battery capacity) corresponds to an almost discharged state, a half charged state, and a fully charged state.

Next, the controller 180 can select gesture sensitivity according to the checked attribute S430.

To describe with an example of FIG. 23, the controller 180 can set up the gesture sensitivity to be significantly large if the attribute of a selected object is 'almost discharged'. In other words, the gesture sensitivity can be so set up that the selected object can be moved a lot even if the user makes a slight movement. On the contrary, the controller 180, if the attribute of the selected object is 'fully charged', can make the gesture sensitivity very small. In other words, the gesture sensitivity can be so established that the selected object can be made to move a small distance even if the user makes a gesture of a large movement.

From the above, descriptions have been made with an example where the attribute of an object is remaining battery capacity; however, gesture sensitivity can be set differently in a similar way to the description above if the attribute of an object corresponds to file size, the amount and/or the number of total files included in a folder. For example, if the file size corresponding to an object is large, larger gesture sensitivity can be selected than the case where the file size corresponding to the object is smaller.

Next, the controller 180 can carry out the steps of S440 and S450.

In the fourth embodiment of the present invention, since the factor for setting up gesture sensitivity is 'attribute of a selected object' which has nothing to do with a movement direction of a gesture, according to the attribute of a selected object, all the gesture sensitivities for the respective axes can have the same value according to the attribute of the selected object. However, it should to be understood that the gesture sensitivities for the respective axes do not necessarily have the same value.

According to the fourth embodiment of the present invention, when multiple objects are displayed through the display unit, by selecting/establishing gesture sensitivities differently from one another according to the attributes of the objects, the user can get feedback on the attributes assigned to the objects according to a movement distance of individual object due to the user's gesture. Accordingly, a possibility of providing more various user interfaces can be increased.

The distance among objects displayed through the display unit and the distance between the user and the objects described above are not physically measurable. In other words, the distance among objects denotes a virtual distance measurable relatively and logically in virtual three-dimensional space where the objects are displayed. And it should be understood that if a distance between the user and an object is said to be distant or close, perspective which can be sensed by the user is assigned to the objects being displayed to provide m the user to feel that the objects are displayed in three-dimensional space; and the object which is considered to be nearer due to the perspective sensed by the user is actually located more closely to the user.

What is claimed is:

1. An electronic device having a three-dimensional display, comprising:
   a sensor configured to obtain information about a motion of a gesture;
   a three-dimensional display; and
   a controller configured to:
      control the three-dimensional display to display a pointer or an object moving in three-dimensional space according to the motion of the gesture;
      determine a movement distance of the pointer or the object in proportion to a movement distance of the gesture by considering gesture sensitivity selected according to a type of application in execution; and
      control the three-dimensional display to display the pointer or the object while moving the pointer or object as much as the determined movement distance,
   wherein the gesture sensitivity is a movement distance of the pointer or the object in proportion to the motion of gesture,
   wherein the gesture sensitivity is variable according to the type of the application in execution, and
   wherein the controller selects the gesture sensitivity by taking account of difference between a maximum depth and a minimum depth implemented at the checked application.

2. The electronic device of claim 1, wherein the gesture sensitivity corresponds to each of multiple applications.

3. The electronic device of claim 1, wherein the gesture sensitivity includes sensitivity along x-axis, sensitivity along y-axis, and sensitivity along z-axis.

4. The electronic device of claim 3, wherein only the sensitivity along the z-axis is varied according to applications.

5. The electronic device of claim 3, wherein sensitivity along the x-axis, sensitivity along the y-axis, and sensitivity about the z-axis are selected to have different values from one another.

6. An electronic device having a three-dimensional display, comprising:
   a sensor configured to obtain information about a motion of a gesture;
   a three-dimensional display; and
   a controller configured to:
      control the three-dimensional display to display a pointer or an object moving in three-dimensional space according to the motion of the gesture;
      determine a movement distance of the pointer or the object in proportion to a movement distance of the gesture by considering gesture sensitivity selected according to the position of the displayed pointer or the object; and
      control the three dimensional display to display the pointer or the object while moving the pointer or object as much as the determined movement distance,
   wherein the gesture sensitivity is a movement distance of the pointer or the object in proportion to the motion of gesture, and
   wherein the gesture sensitivity is variable according to an area to which the position of the object belongs.

7. The electronic device of claim 6, wherein the controller selects the gesture sensitivity according to an application corresponding to the position of the object.

8. An electronic device having a three-dimensional display, comprising:
   a sensor configured to obtain information about a motion of a gesture;
   a three-dimensional display; and
   a controller configured to:
      control the three-dimensional display to display a pointer or an object moving in three-dimensional space according to the motion of the gesture;
      determine a movement distance of the pointer in proportion to a movement distance of the gesture by considering gesture sensitivity selected according to the distance between the first and the second object; and
      control the three dimensional display to display the pointer while moving the pointer as much as the determined movement distance of the pointer,
   wherein the gesture sensitivity is a movement distance of the pointer in proportion to the motion of gesture, and
   wherein the gesture sensitivity is variable according to the distance between the first and the second object.

9. An electronic device having a three-dimensional display, comprising:
   a sensor configured to obtain information about a motion of a gesture;
   a three-dimensional display; and
   a controller configured to:
      control the three-dimensional display to display a pointer or an object moving in three-dimensional space according to the motion of the gesture;
      determine a movement distance of the object in proportion to a movement distance of the gesture by considering gesture sensitivity selected according to attributes of the object selected from the gesture among the at least one object, and
      control the three-dimensional display to display the object while moving the object as much as the determined movement distance of the object,
   wherein the gesture sensitivity is a movement distance of the object in proportion to the motion of gesture,
   wherein the gesture sensitivity is variable according to attributes of the object, and
   wherein the attribute includes at least one among file size, the number of files, and remaining battery capacity.

10. A method for operating an electronic device having a three-dimensional display, comprising:
   obtaining information about a motion of a gesture;
   displaying a pointer or an object moving in the three-dimensional space according to the motion of the gesture;
   selecting gesture sensitivity according to a type of application in execution;
   determining, by considering gesture sensitivity selected according to the type of the application in execution, a movement distance of the pointer or the object in proportion to a movement distance of the gesture; and
   displaying the pointer or object while moving the pointer or object as much as the determined movement distance,
   wherein the gesture sensitivity is a movement distance of the pointer or the object in proportion to the motion of gesture,
   wherein the gesture sensitivity is variable according to the type of the application in execution, and
   wherein the gesture sensitivity is selected by taking account of difference between a maximum depth and a minimum depth implemented at the checked application.

* * * * *